United States Patent
Chuang et al.

(10) Patent No.: US 8,570,876 B2
(45) Date of Patent: Oct. 29, 2013

(54) METHOD, SYSTEM AND PROGRAM PRODUCT FOR PROCESSING REQUESTS

(75) Inventors: Tun-Wu (Michael) Chuang, New York, NY (US); Jason Chan, New York, NY (US)

(73) Assignee: iTB Holdings, Inc., New York, NY (US)

( * ) Notice: Subject to any disclaimer, the term of this patent is extended or adjusted under 35 U.S.C. 154(b) by 102 days.

(21) Appl. No.: 13/327,715

(22) Filed: Dec. 15, 2011

(65) Prior Publication Data
US 2013/0044583 A1    Feb. 21, 2013

Related U.S. Application Data

(60) Provisional application No. 61/423,245, filed on Dec. 15, 2010.

(51) Int. Cl.
*H04L 12/26* (2006.01)
*H04B 7/005* (2006.01)

(52) U.S. Cl.
USPC .......................................... 370/241; 370/278

(58) Field of Classification Search
USPC .......................... 370/216, 241, 254, 278, 282
See application file for complete search history.

(56) References Cited

U.S. PATENT DOCUMENTS

| | | | |
|---|---|---|---|
| 6,587,438 B1 * | 7/2003 | Brendel | 370/238 |
| 2002/0085488 A1 * | 7/2002 | Kobayashi | 370/216 |
| 2012/0147732 A1 * | 6/2012 | Chien et al. | 370/216 |

* cited by examiner

*Primary Examiner* — Hong Cho
(74) *Attorney, Agent, or Firm* — Ariel S. Bentolila; Bay Area IP Group, LLC

(57) ABSTRACT

A method, system and program product comprises queuing a request. The request is transmitted to a server in which the server queues a response, determines if the request is out of sequence, transmits an acknowledgment and an out of order response, and transmits an executed response. Missing requests are retransmitted to the server in which the server asynchronously transmits executed responses. Executed responses are received and removed from the queuing. A response receipt confirmation is transmitted to the server in which the server removes queued responses and processing of requests in order of transmission and detection/retransmission of missing requests is enabled.

20 Claims, 15 Drawing Sheets

FIG. 15

METHOD, SYSTEM AND PROGRAM PRODUCT FOR PROCESSING REQUESTS

CROSS-REFERENCE TO RELATED APPLICATIONS

The present Utility patent application claims priority benefit of the U.S. provisional application for patent Ser. No. 61/423,245 entitled "Bond Trading System and Method", filed on Dec. 15, 2010 under 35 U.S.C. 119(e). The contents of this related provisional application are incorporated herein by reference for all purposes to the extent that such subject matter is not inconsistent herewith or limiting hereof.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

One or more embodiments of the invention generally relate to communication systems. More particularly, one or more embodiments of the invention relate to financial security communication systems.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Electronic trading for fixed income products has existed since the late 90's and continues to grow today. Existing applications in the market allow bond investors to ask bond dealers for quotes electronically and without having to pick up a phone. To a lesser extent, some applications post executable prices and if a matching order is found, these applications provide a means by which a transaction may be executed. There are three major characteristics of existing electronic bond trading systems, and they are steaming quotes, auto-execute matched orders and client application.

Streaming quotes represent the ability for an application to push live market prices to users (push technology) when the underlying market changes, allowing the user to see the latest prices. An alternate to push technology exists where the market prices may change, but the change is not be provided to the user unless the user asks for a quote refresh (pull technology). Existing applications use either push or pull technology.

Auto-execute matched orders represents how a trading system handles two matching orders (a "buy" order and a "sell" order). Typically, existing systems need to confirm orders with the order originator before providing execution. Confirmation of an order is normally needed by existing systems since existing systems are often slower in response time and a human confirmation of orders is needed to prevent errors.

Client application represents how a user can access an application server over an Internet connection. This can be accomplished in two ways. The first is by downloading a client application on to a user's computer and installing that application to provide the user with access to the application server. The second is by accessing the server application via an Internet web browser.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which:

FIG. 15 illustrates an example screen shot associated with real-time portfolio analytics system, in accordance with an embodiment of the present invention;

DETAILED DESCRIPTION OF SOME EMBODIMENTS

Figure 1:
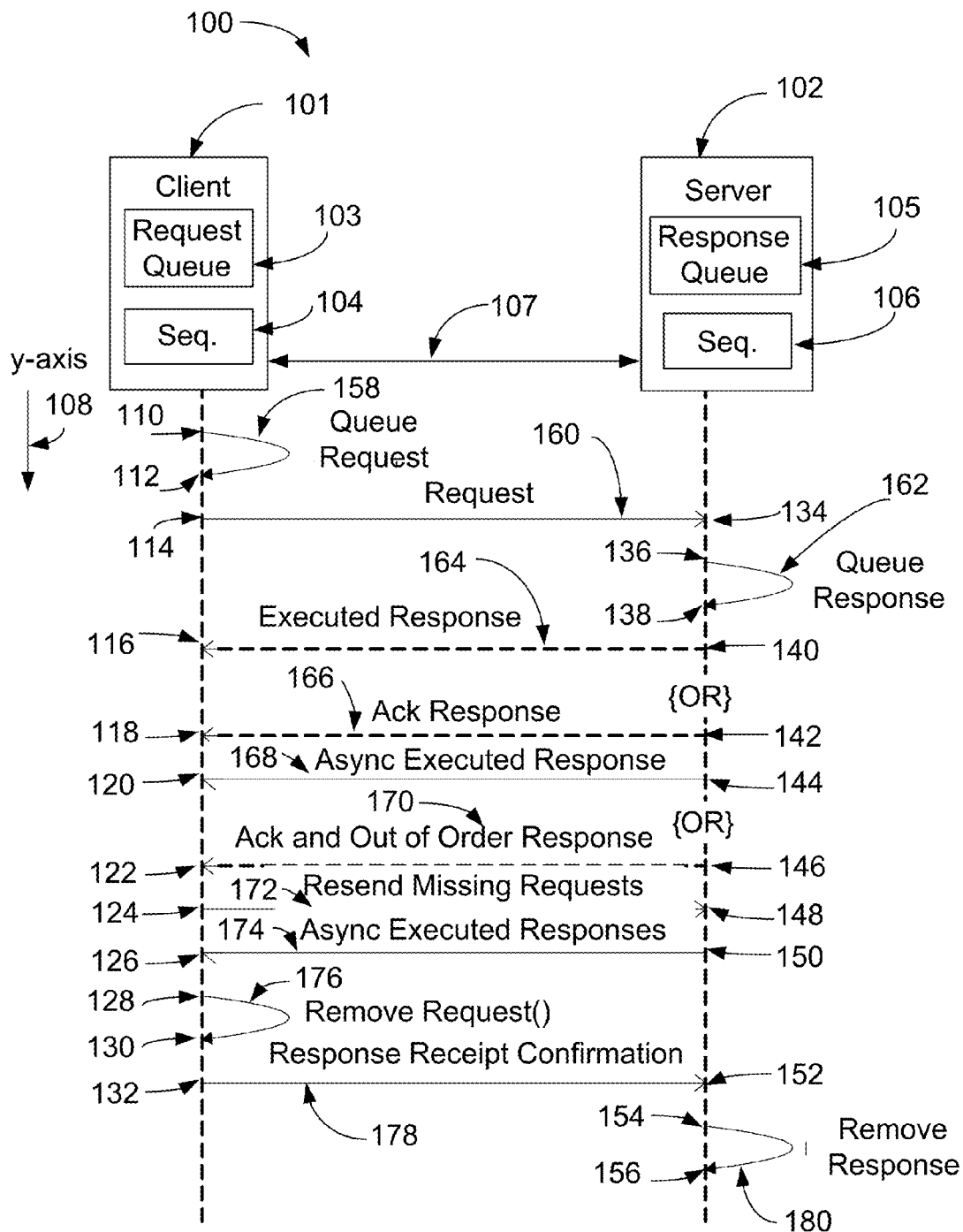
FIG. 1 illustrates an example message protocol, in accordance with an embodiment of the present invention.

Embodiments of the present invention are best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

A "computer" may refer to one or more apparatus and/or one or more systems that are capable of accepting a structured input, processing the structured input according to prescribed rules, and producing results of the processing as output.

Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

"Software" may refer to prescribed rules to operate a computer. Examples of software may include: code segments in one or more computer-readable languages; graphical and or/textual instructions; applets; pre-compiled code; interpreted code; compiled code; and computer programs.

A "computer-readable medium" may refer to any storage device used for storing data accessible by a computer. Examples of a computer-readable medium may include: a magnetic hard disk; a floppy disk; an optical disk, such as a CD-ROM and a DVD; a magnetic tape; a flash memory; a memory chip; and/or other types of media that can store machine-readable instructions thereon.

A "computer system" may refer to a system having one or more computers, where each computer may include a computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet.

Exemplary networks may operate with any of a number of protocols, such as Internet protocol (IP), asynchronous transfer mode (ATM), and/or synchronous optical network (SONET), user datagram protocol (UDP), IEEE 802.x, etc.

Embodiments of the present invention may include apparatuses for performing the operations disclosed herein. An apparatus may be specially constructed for the desired purposes, or it may comprise a general-purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing platform to perform the operations described herein.

In the following description and claims, the terms "computer program medium" and "computer readable medium" may be used to generally refer to media such as, but not limited to, removable storage drives, a hard disk installed in hard disk drive, and the like. These computer program products may provide software to a computer system. Embodiments of the invention may be directed to such computer program products.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

A non-transitory computer readable medium includes, but is not limited to, a hard drive, compact disc, flash memory, volatile memory, random access memory, magnetic memory, optical memory, semiconductor based memory, phase change memory, optical memory, periodically refreshed memory, and the like; however, the non-transitory computer readable medium does not include a pure transitory signal per se.

Embodiments of the present invention will be described which provide means and methods for a reliable communication system enabling processing of messages in order of transmission and detection/retransmission of missing messages. Furthermore, system provides for consolidation of messages and payloads for reducing bandwidth needed for communication information. Furthermore, system provides for synchronization of data for reducing accesses to storage devices.

FIG. 1 illustrates an example message protocol, in accordance with an embodiment of the present invention.

A message protocol 100 includes a client 101 and a server 102.

Client 101 communicates bi-directionally with server 102 via a communication channel 107.

Message protocol 100 via communication channel 107 provides a protocol which client 101 and server 102 follow in order for client 101 to request information or services from server 102.

Client 101 provides a means for a person to interface with system. Non-limiting examples for client 101 include computer, notebook computer, mobile computing device, cellular phone, smartphone and tablet computing device.

Server 102 provides communication, processing and storage of information. Non-limiting examples of information include security quotes, security descriptions, and orders for trading of securities.

Client 101 includes a request queue portion 103 and a sequence processing portion 104.

Request queue portion 103 provides capability for queuing requests to be transmitted.

Sequence processing portion 104 provides capability for processing sequence identifiers. Non-limiting examples of processing include identifying duplicate responses, out of order responses, and missing responses from the server.

Server 102 includes a response queue portion 105 and a sequence processing portion 106.

Response queue portion 105 provides capability for queuing responses to be transmitted.

Sequence processing portion 106 provides capability for processing sequence identifiers. Non-limiting examples of processing include identifying duplicate requests, out of order requests, and missing requests from the client.

Communication channel 107 is used to service client 101 requests for server 102 services and allows server 102 to provide synchronous services or asynchronous services in a reliable manner and providing proper processing of requests.

A y-axis 108 represents time with units of nanoseconds.

Client 101 receives, transmits and/or processes information at a time 110, a time 112, a time 114, a time 116, a time 118, a time 120, a time 122, a time 124, a time 126, a time 128, a time 130 and a time 132.

Server 102 receives, transmits and/or processes information at a time 134, a time 136, a time 138, a time 140, a time 142, a time 144, a time 146, a time 148, a time 150, a time 152, a time 154 and a time 156.

Client 101 initiates a queue request 158 at time 110 with completion at time 112.

Client 101 transmits a request 160 at time 114 and server 102 receives request 160 at time 134.

Server 102 initiates a queue response 162 at time 136 and completes queue response 162 at time 138.

Server 102 transmits an executed response 164 at time 140 and client receives executed response 164 at time 116.

Server 102 transmits an ack response 166 at time 142 and client 101 receives ack response 166 at time 118.

Server 102 transmits an async executed response 168 at time 144 and client 101 receives async executed response 168 at time 120.

Server 102 transmits an ack/out of order response 170 at time 146 and client 101 receives ack/out of order response 170 at time 122.

Client 101 transmits missing requests 172 at time 124 and server 102 receives resend missing requests 172 at time 148.

Server 102 transmits async executed responses 174 at time 150 and async executed responses 174 is received by client 101 at time 126.

Client 101 initiates a remove request 176 at time 128 and completes remove request 176 at time 130.

Client 101 transmits a response receipt confirmation 178 at time 132 and server 102 receives response receipt confirmation 178 at time 152.

Server 102 initiates a remove response 180 at time 154 and completes remove response 180 at time 156.

One of executed response 164, or ack response 166, async executed response 168 or ack/out of order response 170, resend missing requests 172, async executed responses 174 may be performed.

Server 102 maintains a queue of the corresponding responses stored in response queue portion 105 for associated requests awaiting confirmation from client 101. When a request is received by server 102, server 102 verifies via sequence processing portion 106 if the request has already been processed based upon a sequence number.

If server 102 receives a new request (e.g. request 160), the request is forwarded to backend services and a preconfigured timeout is performed for the response. If the timeout is exceeded, server 102 communicates ack response 166 to client 101 indicating to client 101 that server 102 has received the specific request. Client 101 marks the specific request as being acknowledged and does not transmit the specific request again. If timeout is not exceeded, server 102 communicates executed response 164 to client 101. Following transmit of executed response 164, server 102 waits for receipt confirmation from client 101 in order for server 102 to remove response from response queue portion 105.

If request has already been processed by server 102, server 102 transmits executed response 164 and waits for response receipt confirmation 178 from client 101. Following receipt of response receipt confirmation 178 from client 101, server 102 removes response from response queue portion 105 via remove response 180.

If request has already been received by server 102 but server 102 is still processing the request, server 102 transmits ack response 166 to client 101. After receiving ack response 166, client 101 marks the request as being acknowledged and does not transmit request again. Furthermore, client 101 waits for async executed response 168, and following receipt of async executed response 168 removes request from request queue portion 103 via remove request 176. Server 102 receives response receipt confirmation 178 from client 101 and removes response from response queue portion 105 via remove response 180.

Server 102 may detect an out-of-order request or missing request via processing performed by sequence processing portion 106. If a request is received out of order or a request is determined as missing by server 102, server 102 transmits ack/out of order response 170 to client 101. Furthermore, following receipt of ack/out of order response 170, client 101 marks the specific request as being acknowledged and does not transmit the specific request again. Furthermore, client 101 transmits resend missing requests 172 to server 102. Following receipt of missing requests 172, server 102 will process the missing requests in the order intended and indicated by the sequence numbers and then process the original request triggering the sequence number gap in sequence and transmits the resulting responses associated with missing or out-of-order requests.

FIG. 1 illustrates an example message protocol where a client with a request queue and a server with a response queue communicate via a channel where messages contain sequence identifiers for determining missing or out-of-order requests and responses are re-transmitted as needed.

Figure 2:
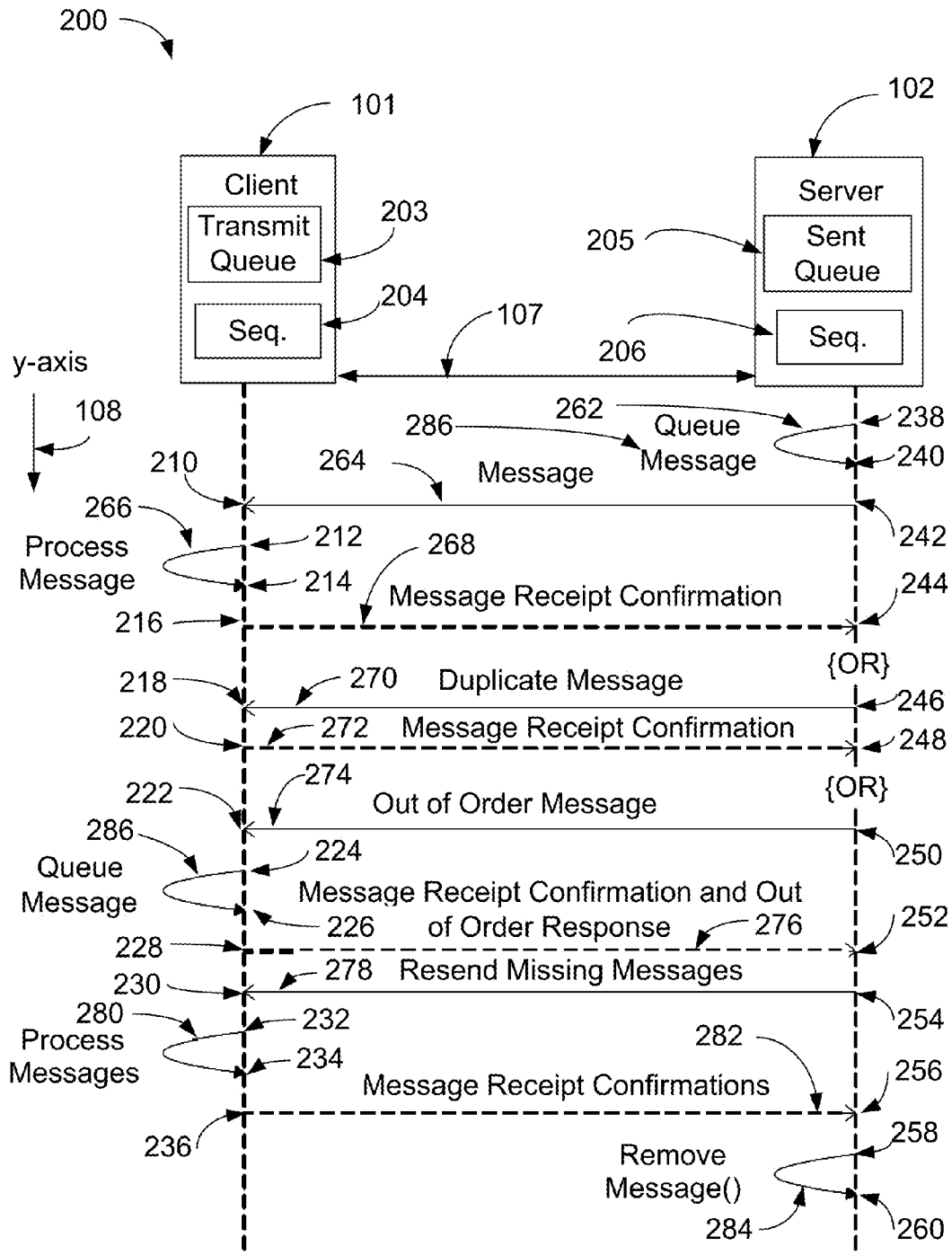
FIG. 2 illustrates an example message protocol, in accordance with an embodiment of the present invention.

FIG. 2 illustrates an example message protocol, in accordance with an embodiment of the present invention.

A message protocol 200 includes client 101 and server 102.

Client 101 communicates bi-directionally with server 102 via communication channel 107.

Message protocol 200 via communication channel 107 provides a communication protocol which enables server 102 to communicate or stream (a.k.a. push) information to client 101 in a reliable manner enabling proper processing of streamed (a.k.a. pushed) messages.

Client 101 provides a means for a person to interface with system. Non-limiting examples for client 101 include computer, notebook computer, mobile computing device, cellular phone, smartphone and tablet computing device.

Server 102 provides communication, processing and storage of information. Non-limiting examples of information include security quotes, security descriptions, and orders for trading of securities.

Client 101 includes a transmit queue portion 203 and a sequence processing portion 204.

Transmit queue portion 203 provides capability for queuing information to be transmitted.

Sequence processing portion 204 provides capability for processing sequence identifiers. Non-limiting examples of processing include identifying duplicate requests, out of order requests, and missing requests from the client.

Server 102 includes a sent queue portion 205 and a sequence processing portion 206.

Sent queue portion 205 provides capability for queuing information to be transmitted.

Sequence processing portion 206 provides capability for processing sequence identifiers. Non-limiting examples of processing include identifying duplicate requests, out of order requests, and missing requests from the client.

Information transmitted by server 102 is placed in sent queue portion 205 with an associated sequence identifier provided by sequence processing portion 206. When server 102 receives a message receipt confirmation from client 101, server 102 removes message from sent queue portion 205. Client 101 receives messages from server 102 and processes sequence identifiers via sequence processing portion 204. Client 101 communicates a message to server 102 for messages detected as missing or out-of-order by sequence processing portion 204.

Y-axis 108 represents time with units of nanoseconds.

Client 101 receives, transmits and/or processes information at a time 210, a time 212, a time 214, a time 216, a time 218, a time 220, a time 222, a time 224, a time 226, a time 228, a time 230, a time 232, a time 234 and a time 236.

Server 102 receives, transmits and/or processes information at a time 238, a time 240, a time 242, a time 244, a time 246, a time 248, a time 250, a time 252, a time 254, a time 256, a time 258 and a time 260.

Server 102 initiates a queue message 262 at time 238 with completion at time 240.

Server 102 transmits a message 264 at time 242 and client receives message 264 at time 210.

Client 101 initiates a process message 266 at time 212 and completes process message 266 at time 214.

Client 101 transmits a message receipt confirmation 268 at time 216 and server 102 receives message receipt confirmation 268 at time 244.

Server 102 transmits a duplicate message 270 at time 246 and client 101 receives duplicate message 270 at time 218.

Client 101 transmits a message receipt confirmation 272 at time 220 and message receipt confirmation 272 is received by server 102 at time 248.

Server 102 transmits an out of order message 274 at time 250 and client 101 receives out of order message 274 at time 222.

Client 101 initiates a queue message 286? at time 224 with completion at time 226.

Client 101 transmits a message receipt confirmation/out of order response 276 at time 228 and server 102 receives message receipt confirmation/out of order response 276 at time 252.

Server 102 transmits resends missing messages 278 at time 254 and client 101 receives missing messages 278 at time 230.

Client 101 initiates a process message 280 at time 232 and completes process message 280 at time 234.

Client 101 transmits a message receipt confirmation 282 at time 236 and server 102 receives message receipt confirmation 282 at time 256.

Server 102 initiates a remove message 284 at time 258 and completes remove message 284 at time 260.

One of message receipt confirmation 268, or duplicate message 270, message receipt confirmation 272, or out of order message 274, message receipt confirmation/out of order response 276, resend missing messages 278 may be performed.

If the messages received by client 101 (e.g. message 264) is new and the sequence identifier is sequential based upon the last processed message's sequence identifier, client 101 processes received message via process message 266 and transmits message receipt confirmation 268 to server 102. Furthermore, server 102 removes message from sent queue portion 205 via remove message 284.

If message received by client 101 is a duplicate (i.e. duplicate message 270), client 101 transmits a receipt confirmation (i.e. message receipt confirmation 272) to server 102. Furthermore, server 102 removes message from sent queue portion 205 via remove message 284.

If message received by client 101 is new and the associated sequence identifier is gapped based upon the sequence identifier of the last received message (i.e. out of order message 274), client 101 transmits a request to resend the missing messages (i.e. message receipt confirmation/out of order response). Furthermore, client 101 transmits a receipt confirmation to server 102 such that server 102 may remove the message from sent queue portion 205 via remove message 284. Furthermore, server 102 re-transmits missing messages (i.e. resend missing messages 278) and waits for client to communicate a receipt confirmation (i.e. message receipt confirmation 282). Furthermore, server 102 removes message from sent queue portion 205 via remove message 284.

FIG. 2 illustrates an example message protocol where a server with a send queue transmits information to a client with a transmit queue via a channel where messages contain sequence identifiers for determining missing or out-of-order information and information is re-transmitted as needed.

Figure 3:
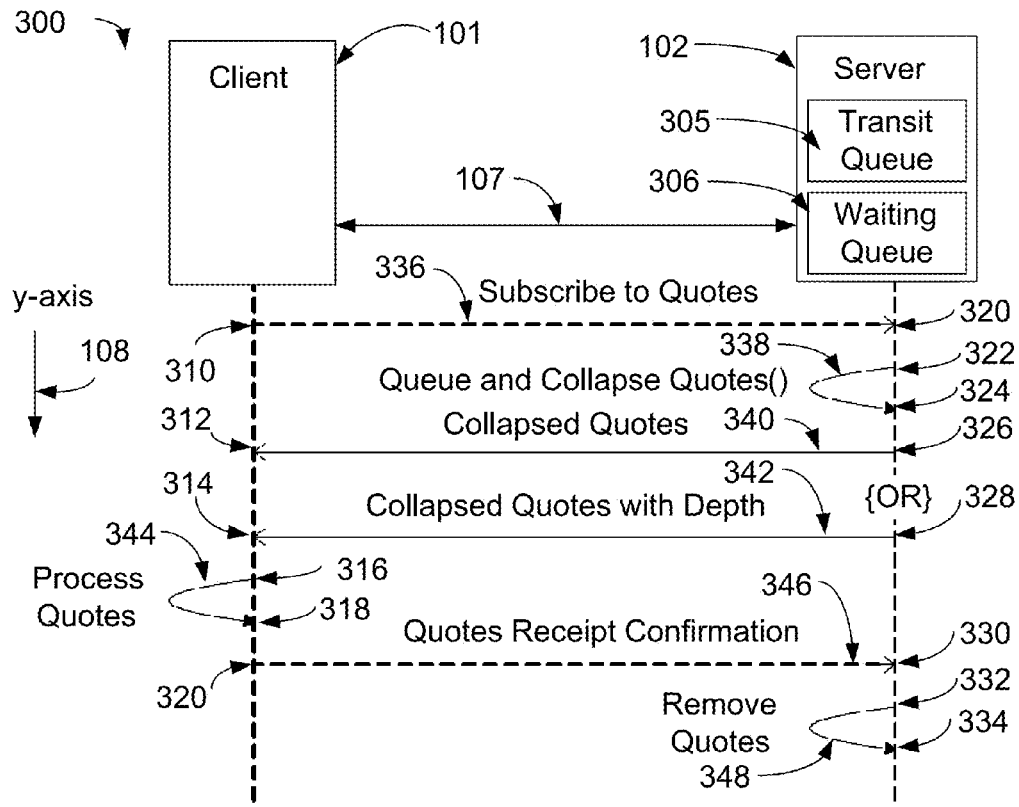
FIG. 3 illustrates an example message protocol, in accordance with an embodiment of the present invention.

FIG. 3 illustrates an example message protocol, in accordance with an embodiment of the present invention.

A message protocol 300 includes client 101 and server 102.

Client 101 communicates bi-directionally with server 102 via communication channel 107.

Message protocol 300 via communication channel 107 provides a communication protocol which enables client 101 to communicate subscription information to server 102 and for server 102 to provide quote information, including collapsed quote information to client 101.

Client 101 provides a means for a person to interface with system. Non-limiting examples for client 101 include computer, notebook computer, mobile computing device, cellular phone, smartphone and tablet computing device.

Server 102 provides communication, processing and storage of information. Non-limiting examples of information include security quotes.

Server 102 includes a transit queue portion 305 and a waiting queue portion 306.

Transit queue portion 305 contains information in transit.

Waiting queue portion 306 contains information waiting to be sent.

Y-axis 108 represents time with units of nanoseconds.

Client 101 receives, transmits and/or processes information at a time 310, a time 312, a time 314, a time 316, a time 318 and a time 320.

Server 102 receives, transmits and/or processes information at time 320, a time 322, a time 324, a time 326, a time 328, a time 330, a time 332 and a time 334.

Client 101 transmits a subscribe to quotes 336 at time 310 and server 102 receives subscribe to quotes 336 at time 320.

Server 102 initiates a queue/collapse quotes 338 at time 322 and completes queue/collapse quotes 338 at time 324.

Server 102 transmits a collapsed quotes 340 at time 326 and client 101 receives collapsed quotes 340 at time 312.

Server 102 transmits a collapsed quotes with depth 342 at time 328 and client 101 receives collapsed quotes with depth 342 at time 314.

Client 101 initiates a process quotes 344 at time 316 and completes process quotes 344 at time 318.

Client 101 transmits a quotes receipt confirmation 346 at time 320 and server 102 receives quotes receipt confirmation 346 at time 330.

Server 102 initiates a remove quotes 348 at time 332 and completes remove quotes 348 at time 334.

One of collapsed quotes 340, or collapsed quotes with depth 342 may be performed.

Information contained in transit queue portion 305 is associated with transmitted messages.

Information contained in waiting queue portion 306 is associated with information being collapsed and populated for future transmission.

As server 102 receives confirmation receipts from client 101, the associated information in transit queue portion 305 is removed. After a preconfigured timeout elapses the remaining unconfirmed quotes in the transit queue portion 305 are merged and collapsed into the waiting queue portion 306. When transit queue portion 305 is fully collapsed and merged into the waiting queue portion 306, the transit queue portion 305 will be empty. At this point the transit queue portion 305 and waiting queue portion 306 exchanges functions where the old waiting queue portion 306 becomes the new transit queue portion 305 and vice versa. After the swap the information in the new transit queue portion 305 will be transmitted and confirmed as usual while the new waiting queue portion 306 continues accumulating new information for future transmission.

FIG. 3 illustrates an example message protocol where a client and a server with two queues communicate via a channel using a protocol for client subscribing for information and server communicating subscribed information re-transmitting it as needed and minimizing the amount of subscribed information sent to the client.

Figure 4:
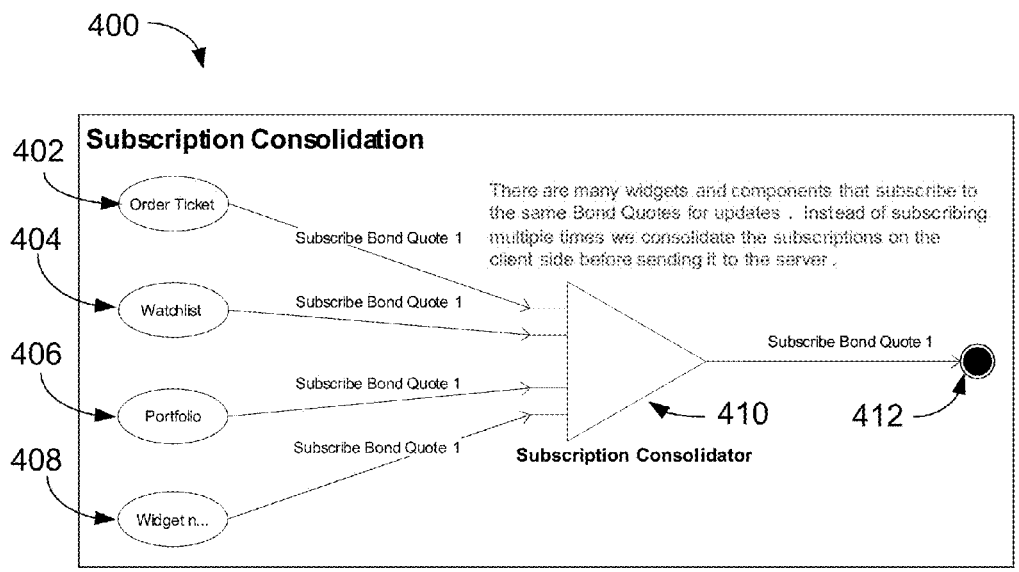
FIG. 4 illustrates an example of subscription consolidation, in accordance with an embodiment of the present invention.

FIG. 4 illustrates an example of subscription consolidation, in accordance with an embodiment of the present invention.

A subscription consolidation 400 includes a component portion 402, a component portion 404, a component portion 406, a component portion 408, a consolidation portion 410 and a subscription request 412.

Subscription consolidation 400 provides for consolidating a multiplicity of subscription requests into fewer subscription requests.

Component portion 402, component portion 404, component portion 406 and component portion 408 seek to subscribe to the same information.

Consolidation portion 410 receives the subscription requests from component portion 402, component portion 404, component portion 406 and component portion 408 and consolidates the multiplicity of subscription requests into subscription request 412.

Reducing the subscriptions reduces the amount of communication between client 101 and server 102 as well as between processing layers associated with client 101.

FIG. 4 illustrates an example of subscription consolidation where a multiplicity of subscription requests are consolidated into fewer subscription requests.

Figure 5:
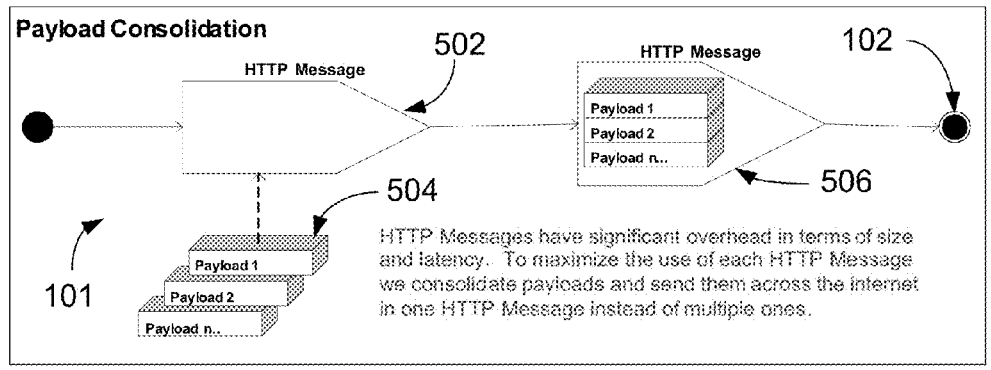
FIG. 5 illustrates an example of payload consolidation, in accordance with an embodiment of the present invention.

FIG. 5 illustrates an example of payload consolidation, in accordance with an embodiment of the present invention.

A payload consolidation 500 includes client 101 and server 102.

A consolidation portion 502 receives a multiplicity of payloads with a sampling noted as a payload 504. Furthermore, consolidation portion 502 consolidates received payloads to generate a consolidated message 506. Consolidated message 506 is received and processed by server 102. As a non-limiting example, information is transported via Hypertext Transfer Protocol (HTTP).

In order to reduce data transported via the network, messages are consolidated for communication. Client 101 consolidates messages for communication to server 102. Furthermore, for server 102 communicating to client 101, a single destination topic or client identification is configured for a client for subscriptions to allow the server 102 to be able to consolidate subscribed information.

Data transport reduction is a result of reduced overhead information used for identification and routing associated with fewer communicated messages.

FIG. 5 illustrates an example of payload consolidation where a multiplicity of payload information is consolidated for a reduced amount of data transport in order to reduce the amount of bandwidth needed for performing communication.

Figure 6:
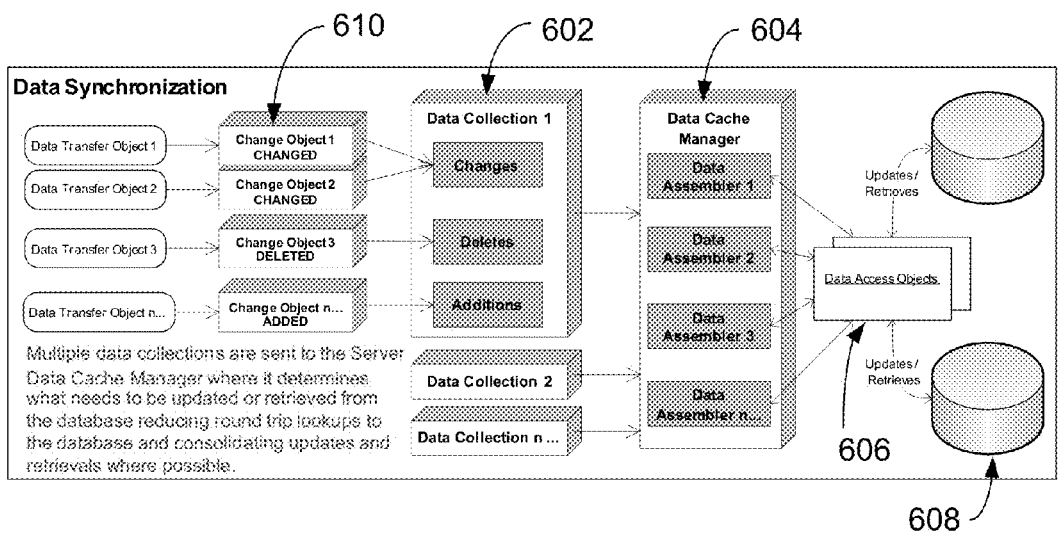
FIG. 6 illustrates an example of data synchronization server, in accordance with an embodiment of the present invention.

FIG. 6 illustrates an example of data synchronization server, in accordance with an embodiment of the present invention.

A data synchronization server 600 includes a multiplicity of data collection portions with a sampling noted as a data collection portion 602, a data cache manager portion 604, a multiplicity of data access portions with a sampling noted as a data access portion 606 and a multiplicity of storage devices with a sampling noted as a storage device 608.

Data synchronization server 600 receives, stores, retrieves and processes information.

Data collection portion 602 collects data. Non-limiting examples of data collected include changes, deletions and additions. Data cache manager portion 604 performs cache management. Data access portion 606 provides access to storage devices for storage and retrieval. Storage device 608 provides storage and retrieval of information.

Data collection portion 602 receives and processes information from change entities with a sampling noted as a change entity 610. Non-limiting examples of information received and processed include changes, deletions and additions. As a non-limiting example, data collection portion 602 aggregates or sorts information into groups. Non-limiting examples of grouping include changes, deletions and additions.

Data cache manager portion 604 receives information from data collection portion 602 and determines information needing creation, update or retrieval. Data cache manager portion 604 provides management for reducing the amount of information needing updated or retrieved from the database. Furthermore, data cache manager portion 604 reduces round trip lookups to the database and consolidates updates and retrievals to the database. As a non-limiting example, a request to store information and delete the same information may be received by data cache manager portion 604. Furthermore, data cache manager portion 604 may opt to forgo the operation for storage of information, as the information is to be deleted, and as such is not needed for future operations.

Information may be throttled with a preconfigured time interval in order to collapse information updates. As a non-limiting example, if the same information is updated a multiplicity of times within the preconfigured time interval, the server updates the latest quote update received.

FIG. 6 illustrates an example of data synchronization server where information updates may be sorted, collected and managed for reducing access to storage devices.

Figure 7A:
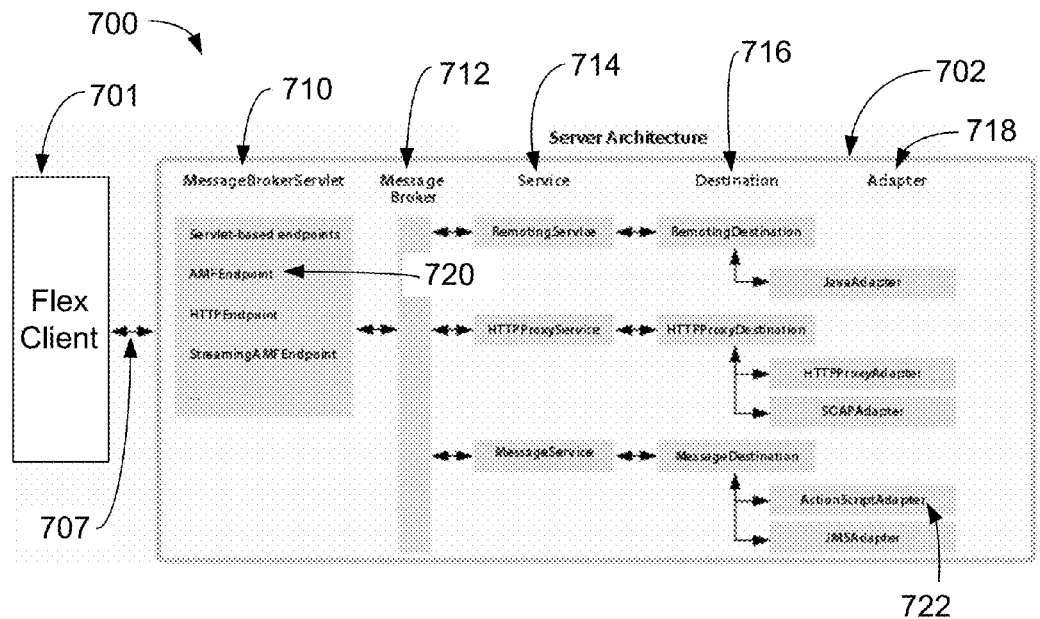
FIG. 7A illustrates an example architecture of a conventional server system.

FIG. 7A illustrates an example architecture of a conventional server system.

A system 700 includes a client 701 and a server 702.

System 700 provides for bi-directional communication between client 701 and server 702 via a communication channel 707.

Client 701 provides a means for a person to interface with system. Non-limiting examples for client 101 include computer, notebook computer, mobile computing device, cellular phone, smartphone and tablet computing device.

Server 702 provides communication, processing and storage of information.

Server 702 includes an endpoints portion 710, a message broker portion 712, a services portion 714, a destinations portion 716 and an adapters portion 718.

Endpoints portion 710 are internal to the Java 2 Platform Enterprise Edition (J2EE) servlet container, which means that the servlet handles the Input/Output (I/O) and HTTP sessions for the endpoints. An HTTP session listener is registered with the J2EE server in the web application's configuration file so that server 702 has HTTP session attribute and binding listener support.

Message broker portion 712 is responsible for routing messages to services and is located in the inner portions of the server. After endpoints portion 710 initially processes the request, it extracts the message from the request and passes it to the message broker portion 712. Message broker portion 712 inspects the message's destination and passes the message to its intended service. If the destination is protected by a security constraint, message broker portion 712 performs authentication and authorization checks before passing the message along.

Services portion 714 are the targets of messages from components associated with client 701.

Destinations portion 716 may be considered as instances of services portion 714 configured for specific applications.

Adapters portion 718 receive messages and fulfill requests either locally or by contacting a backend system or a remote server.

Endpoints portion 710 includes an AMF endpoint portion 720. AMF endpoint portion 720 enables the communication of data via HTTP in a binary format associated with an asynchronous call and response model.

Adapters portion 718 includes an action script adapter portion 722. Action script adapter enables messaging with client 701 as a producer and consumer associated with communicated messages.

Client 701 implement channels for communication with endpoints portion 710 providing services such as serialization and session management. Messages are forward to message broker portion 712 which selects the correct service associated with services portion 714 for handling message. Furthermore, services portion 714 delegates the message to the mapped destination associated with destinations portion 716. Furthermore, destinations portion 716 maps the message to an adapter associated with adapters portion 718 for further processing of the message and for locating a backend system service for forwarding a message to.

FIG. 7A illustrates an example architecture of a conventional server system where server operates via an endpoints portion, a message broker portion, a services portion, a destinations portion and an adapters portion.

Figure 7B:
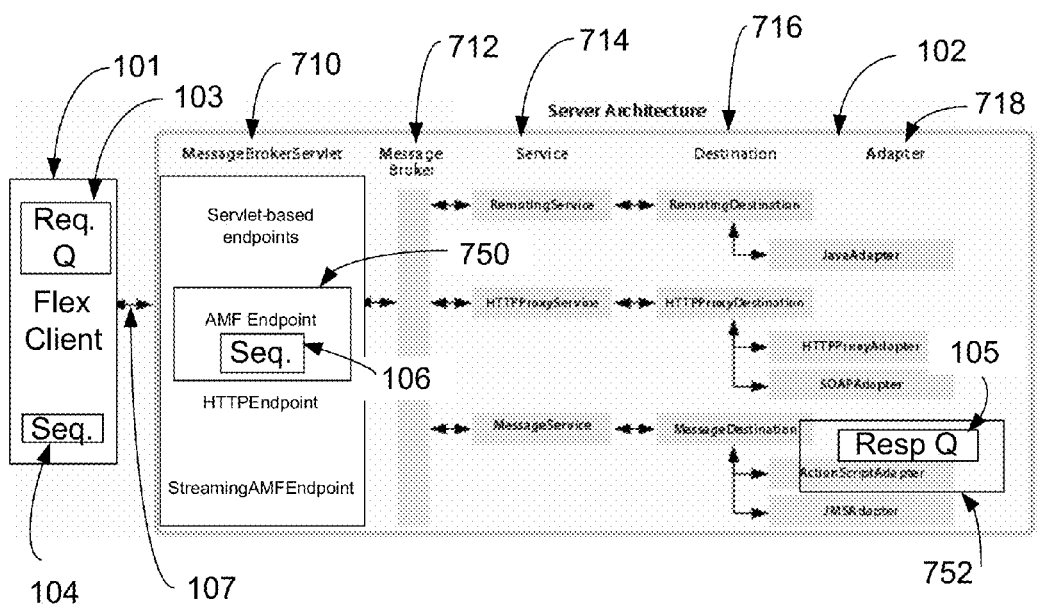
FIG. 7B illustrates an example server system implementing the example message protocol as described with reference to FIG. 1, in accordance with an embodiment of the present invention.

FIG. 7B illustrates an example server system implementing the example message protocol as described with reference to FIG. 1, in accordance with an embodiment of the present invention.

Client 101 is a modified version of client 701 as described with reference to FIG. 7A. Server 102 is a modified version of server 702 as described with reference to FIG. 7A.

Client 101 includes elements of client 701 in addition to elements as described with reference to FIG. 1. Server 102 includes elements of server 702 in addition to elements as described with reference to FIG. 1.

Additional elements include request queue portion 103, sequence processing portion 104 associated with client 101 and an AMF endpoint 750, an action script adapter portion 752, response queue portion 105 and sequence processing portion 106 associated with server 102.

AMF endpoint 750 performs the functions of AMF endpoint portion 720 as described with reference to FIG. 7A with additional functions for processing messages associated with sequence processing portion 106.

Action script adapter portion 752 performs the functions of action script adapter portion 722 as described with reference to FIG. 7A with additional functions for processing messages associated with response queue portion 105.

To implement server 102 and message protocol 100 as described with reference to FIG. 1, functions of server 702 as described with reference to FIG. 7A are replaced with custom functions associated with channels, endpoints portion 710 and adapters portion 718.

One type of customer channel created is a request/response channel associated with server 102 and message protocol 100 as described with reference to FIG. 1.

For client 101, a class is created by extending the channel classes for HTTP and Secure Socket Layer (SSL) communications and adding functionally to insert sequence numbers via sequence processing portion 104 into the message headers and maintaining a queue of requests via request queue portion 103 awaiting confirmation from server 102.

For server 102, a class is created by extending the endpoint and adapter classes for HTTP and Secure Socket Layer (SSL) communications and adding functionality to process requests from client 101 via addition of response queue portion 105 to action script adapter portion 722 (FIG. 7A) and addition of sequence processing portion 106 to AMF endpoint portion 720 (FIG. 7A).

FIG. 7B illustrates an example server system implementing the example message protocol as described with reference to FIG. 1 where sequence and queue processing are added to a conventional server system for improving operation for communication of associated information.

Figure 7C:
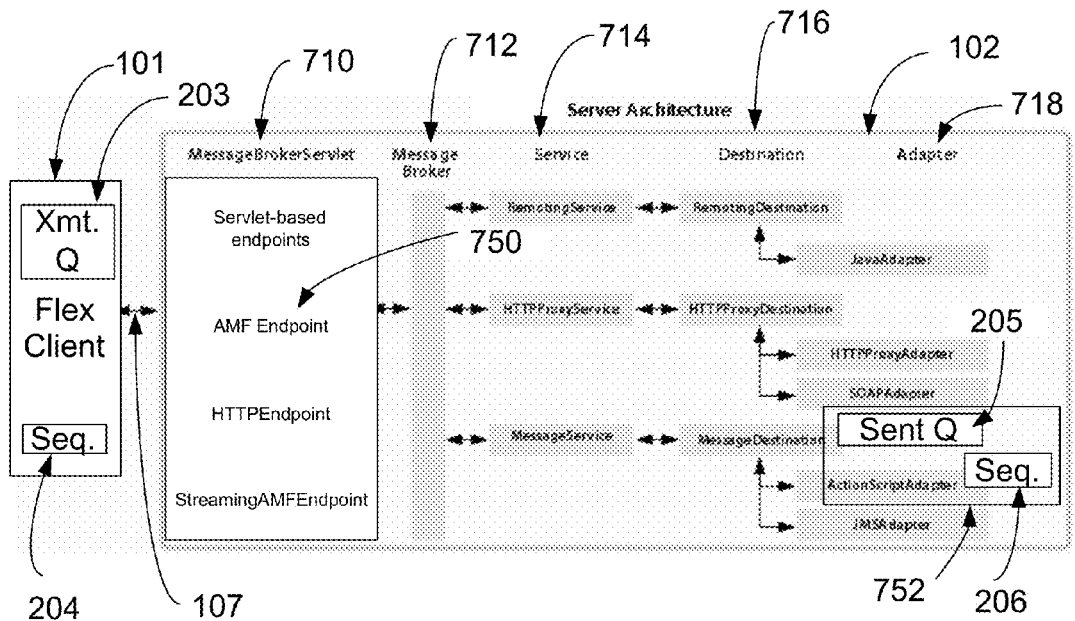
FIG. 7C illustrates an example server system implementing the example message protocol as described with reference to FIG. 2, in accordance with an embodiment of the present invention.

FIG. 7C illustrates an example server system implementing the example message protocol as described with reference to FIG. 2, in accordance with an embodiment of the present invention.

Client 101 is a modified version of client 701 as described with reference to FIG. 7A. Server 102 is a modified version of server 702 as described with reference to FIG. 7A.

Server 102 includes elements of server 702 in addition to elements as described with reference to FIG. 2.

Additional elements include transmit queue portion 203, sequence processing portion 204 associated with client 101 and AMF endpoint 750, action script adapter portion 752, sent queue portion 205 and sequence processing portion 206 associated with server 102.

AMF endpoint 750 performs the functions of AMF endpoint portion 720 as described with reference to FIG. 7A with additional functions for processing messages associated with sent queue portion 205 and sequence processing portion 206 associated with action script adapter portion 752.

Action script adapter portion 752 performs the functions of action script adapter portion 722 as described with reference to FIG. 7A with additional functions for processing messages associated with sent queue portion 205 and sequence processing portion 206.

For client 101, a class is provided for extending the channel classes for HTTP and Secure Socket Layer (SSL) communications. Furthermore, additional functionality provide for processing messages in the appropriate order. As a non-limiting example, sequence processing portion 204 provides sequence identifiers for determining the order of transmission for a message.

For server 102, a class is provided for extending the endpoint and adapter classes for HTTP and Secure Socket Layer (SSL) communications. Furthermore, functionality is provided for processing confirmed messages and retransmitting missing messages as requested by client 101 associated with sent queue portion 205. Furthermore, a class is provided for extending action script adapter portion 752 for inserting sequence identifiers into the message headers of messages via sequence processing portion 206 and to maintain a queue of sent messages via sent queue portion 205 awaiting confirmation from client 101. Server 102 uses polling AMF endpoint to transmit messages to client 101 with action script adapter portion 752 maintaining a queue of sent messages via sent queue portion 205 awaiting client receipt confirmation. Client 101 processes the received messages based upon sequence number as described with reference to FIG. 2.

FIG. 7C illustrates an example server system implementing the example message protocol as described with reference to FIG. 2 where sequence and queue processing are added to a conventional server system for improving operation for communication of associated information.

Figure 7D:
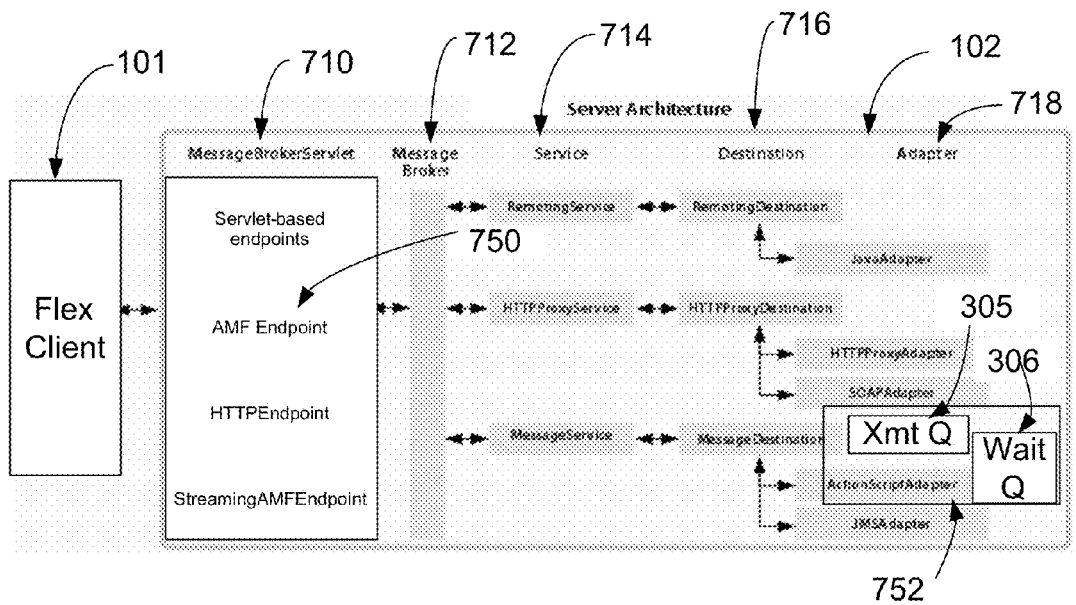
FIG. 7D illustrates an example server system implementing the example message protocol as described with reference to FIG. 3, in accordance with an embodiment of the present invention.

FIG. 7D illustrates an example server system implementing the example message protocol as described with reference to FIG. 3, in accordance with an embodiment of the present invention.

Client 101 is a modified version of client 701 as described with reference to FIG. 7A. Server 102 is a modified version of server 702 as described with reference to FIG. 7A.

Client 101 includes elements of client 701 in addition to elements as described with reference to FIG. 3. Server 102 includes elements of server 702 in addition to elements as described with reference to FIG. 3.

Additional elements include AMF endpoint 750, action script adapter portion 752, transit queue portion 305 and waiting queue portion 306 associated with server 102.

AMF endpoint 750 performs the functions of AMF endpoint portion 720 as described with reference to FIG. 7A with additional functions for processing messages associated with transit queue portion 305 and waiting queue portion 306 associated with action script adapter portion 752.

Action script adapter portion 752 performs the functions of action script adapter portion 722 as described with reference to FIG. 7A with additional functions for processing messages associated with transit queue portion 305 and waiting queue portion 306.

System provides capability for server 102 to transmit messages to client 101 in a reliable manner and with proper processing (e.g. order of delivery).

Client 101 provides a class for extending the channel classes for HTTP and Secure Socket Layer (SSL) communications. Furthermore, functionality is provided for processing received information and transmitting receipt confirmations to server 102.

Server 102 provides a class extending the endpoint and adapter classes for HTTP and Secure Socket Layer (SSL) communications. Furthermore, functionality is provided for processing confirmed information and for transmitting collapsed information from transit queue portion 305. Furthermore, functionality is added to track transmitted information and collapse information via transit queue portion 305 and waiting queue portion 306. AMF endpoint portion 750 transmits information contained within transit queue portion 305. Furthermore, action script adapter portion 752 ensures that new information is collapsed and placed in waiting queue portion 306 for future transmission. Client 101 transmits receipt confirmations to server 102 where AMF endpoint portion 750 removes associated information from transit queue portion 305. Furthermore action script adapter portion 752 collapses and merges the remaining information in the waiting queue portion 306. After collapsing and merging the information in the transit queue portion 305 into the waiting queue portion 306, the transit queue portion 305 will be empty. At this point the functions of transit queue portion 305 and waiting queue portion 306 are swapped so that the old waiting queue portion 306 becomes the new transit queue portion 305 and vice versa. The AMF endpoint portion 750 will begin to transmit the information in the new transit queue portion 305 as usual to client 101 and new information will be accumulated and collapsed in the new waiting queue portion 306 by the action script adapter portion 752 on server 102.

FIG. 7D illustrates an example server system implementing the example message protocol as described with reference to FIG. 3 where sequence and queue processing are added to a conventional server system for improving operation for communication of associated information.

Figure 8:
FIG. 8 illustrates an example method for the message protocol described with reference to FIG. 1 and the system as described with reference to FIG. 7B, in accordance with an embodiment of the present invention.

FIG. 8 illustrates an example method for the message protocol described with reference to FIG. 1 and the system as described with reference to FIG. 7B, in accordance with an embodiment of the present invention.

A method 800 initiates in a step 802.

Then in a step 804, client generates a request.

Client 101 generates a request 160 based on user actions as described with reference to FIG. 1.

Referring back to FIG. 8, then in a step 806, client queues request.

Client 101 queues a request 160 to request queue portion 103 via queue request 158 as described with reference to FIG. 1.

Referring back to FIG. 8, then in a step 808, client transmits request to server.

Client 101 transmits request 160 to server 102 as described with reference to FIG. 1.

Referring back to FIG. 8, then in a step 810, a determination if a request was previously responded to is performed.

Sequence processing portion 106 of server 102 determines if a request was previously responded to as described with reference to FIG. 1.

Referring back to FIG. 8, if a request was previously responded to is determined in step 810, then in a step 812 a retransmission of the associated ack or executed response is performed.

Sequence processing portion 106 of server 102 retransmits the associated ack 166 or executed response 164 as described with reference to FIG. 1.

Referring back to FIG. 8, if a request was not previously responded to is determined in step 810, then in a step 814, a determination for an out of order request is performed.

Sequence processing portion 106 of server 102 determines if a request has been communicated out of order as described with reference to FIG. 1.

Referring back to FIG. 8, if an out of order message is determined in step 814, then in a step 816 an ack and out of order response are generated.

Server 102 generates an ack and an out of order response 170 as described with reference to FIG. 1.

Referring back to FIG. 8, then in a step 818, server queues ack/response.

Server 102 queues ack and out of order response 170 to response queue portion 105 via queue response 162 as described with reference to FIG. 1.

Referring back to FIG. 8, then in a step 820, server transmits ack and out of order response.

Server 102 transmits ack/out of order response 170 to client 101 as described with reference to FIG. 1.

Referring back to FIG. 8, then in a step 822 client retransmits missing requests to server, then in a step 824 a determination for a timeout is performed.

Client 101 transmits missing requests via resend missing requests 172 as described with reference to FIG. 1.

Referring back to FIG. 8, if an out of order message is not determined in step 814, then in a step 824 a determination for a timeout is performed.

Server 102 determines if a timeout for sending a response to client 101 has occurred as described with reference to FIG. 1.

Referring back to FIG. 8, if a timeout is determined in step 824, then in a step 832 an acknowledgement is generated.

Server 102 generates an acknowledgement 166 as described with reference to FIG. 1.

Referring back to FIG. 8, then in a step 834, server queues ack/response.

Server 102 queues ack 166 response to response queue portion 105 via queue response 162 as described with reference to FIG. 1.

Referring back to FIG. 8, then in a step 836, server transmits acknowledgement.

Server 102 transmits ack response 166 to client 101 as described with reference to FIG. 1.

Referring back to FIG. 8, then in a step 838 an asynchronous executed response is generated.

Server 102 generates an asynchronous executed response 168 or a series of asynchronous executed responses 174 as described with reference to FIG. 1.

Referring back to FIG. 8, then in a step 840, server queues asynchronous executed response.

Server 102 queues asynchronous executed response 168 or asynchronous executed responses 174 to response queue portion 105 via queue response 162 as described with reference to FIG. 1.

Referring back to FIG. 8, then in a step 842 an asynchronous executed response is transmitted.

Server 102 transmits asynchronous executed response 168 or asynchronous executed responses 174 to client 101 as described with reference to FIG. 1.

Referring back to FIG. 8, if a timeout is not determined in step 824, then in a step 826, an executed response is generated.

Server 102 generates an executed response 164 as described with reference to FIG. 1.

Referring back to FIG. 8, then in a step 828, server queues executed response.

Server 102 queues executed response 164 to response queue portion 105 via queue response 162 as described with reference to FIG. 1.

Referring back to FIG. 8, then in a step 830, server transmits executed response.

Server 102 transmits executed response 164 to client 101 as described with reference to FIG. 1.

Referring back to FIG. 8, after each executed response is sent to client, then in a step 844, client request is removed.

Client 101 removes request from request queue portion 103 via remove request 176 as described with reference to FIG. 1.

Referring back to FIG. 8, then in a step 846, response receipt confirmation is transmitted.

Client 101 transmits response receipt confirmation 178 to server 102 as described with reference to FIG. 1.

Referring back to FIG. 8, then in a step 848, response is removed.

Server 102 removes response from response queue portion 105 via remove response 180 as described with reference to FIG. 1.

Referring back to FIG. 8, then in a step method 800 terminates execution at step 850.

FIG. 8 illustrates an example method where a client with a request queue and a server with a response queue communicate via a channel where messages contain sequence identifiers for determining missing or out-of-order requests and requests are re-transmitted as needed.

Figure 9:
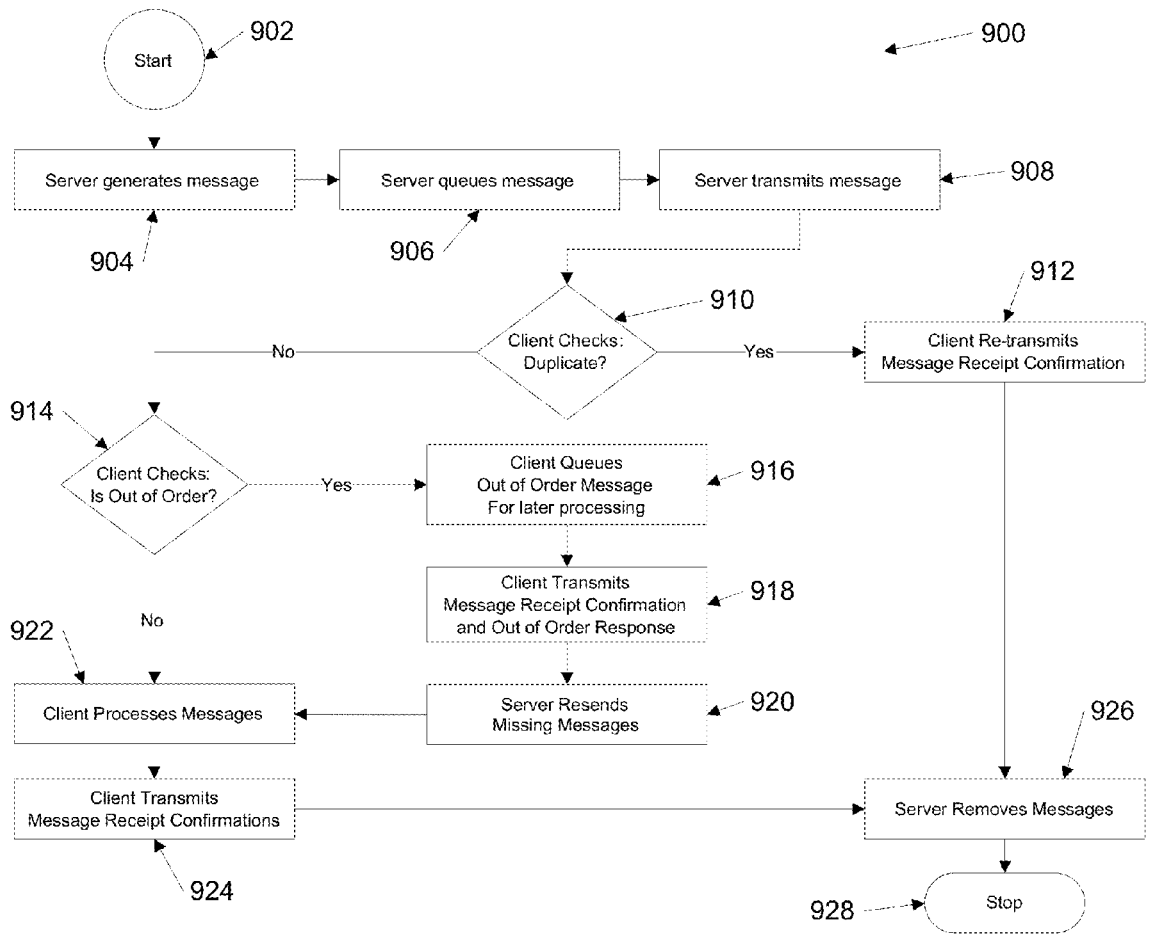
FIG. 9 illustrates an example method for the message protocol described with reference to FIG. 2 and the system as described with reference to FIG. 7C, in accordance with an embodiment of the present invention.

FIG. 9 illustrates an example method for the message protocol described with reference to FIG. 2 and the system as described with reference to FIG. 7C, in accordance with an embodiment of the present invention.

A method 900 initiates in a step 902.

Then in a step 904, server generates a message.

Server 102 generates a message 264 as described with reference to FIG. 2.

Referring back to FIG. 9, then in a step 906, server queues message.

Server 102 queues a message 264 to sent queue portion 205 via queue message 262 as described with reference to FIG. 2.

Referring back to FIG. 9, then in a step 908, server transmits message to client.

Server 102 transmits message 264 to client 101 as described with reference to FIG. 2.

Referring back to FIG. 9, then in a step 910, a determination if message is a duplicate is performed.

Sequence processing portion 204 of client 101 determines if message is a duplicate as described with reference to FIG. 2.

Referring back to FIG. 9, if a message is a duplicate is determined in step 910, then in a step 912 a message receipt confirmation is retransmitted.

Client 101 retransmits a message receipt confirmation 272 as described with reference to FIG. 2.

Referring back to FIG. 9, if a message is not a duplicate is determined in step 910, then in a step 914 a determination for an out of order message is performed.

Sequence processing portion 204 of client 101 determines if a message has been communicated out of order as described with reference to FIG. 2.

Referring back to FIG. 9, if an out of order message is determined in step 914, then in a step 916 the out of order message is queued for later processing.

Client 101 queues an out of order message 274 in transmit queue portion 203 via queue message 286 as described with reference to FIG. 2.

Referring back to FIG. 9, then in a step 918, client transmits message receipt confirmation and out of order response to server.

Client 101 transmits message receipt confirmation and out of order response 276 to server 102 as described with reference to FIG. 2.

Referring back to FIG. 9, then in a step 920 server resends missing messages, then in a step 922 client processes messages.

Server 102 transmits resend missing messages 278 to client 101 as described with reference to FIG. 2.

Referring back to FIG. 9, then in a step 922 client processes received messages.

Client 101 processes received messages via process messages 280 as described with reference to FIG. 2.

Referring back to FIG. 9, after messages are processed, then in a step 924 client transmits message receipt confirmations.

Client 101 transmits message receipt confirmations 282 as described with reference to FIG. 2.

Referring back to FIG. 9, if an out of order message is not determined in step 914, then in a step 922 client processes received messages.

Client 101 processes received messages via process message 266 as described with reference to FIG. 2.

Referring back to FIG. 9, after messages are processed, then in a step 924 client transmits message receipt confirmations.

Client 101 transmits message receipt confirmations 268 as described with reference to FIG. 2.

Referring back to FIG. 9, after receiving a message receipt confirmation, then in a step 926 server removes messages from queue.

Server 102 removes message from sent queue portion 205 via remove message 284 as described with reference to FIG. 2.

Referring back to FIG. 9, then in a step 928 method 900 terminates execution.

FIG. 9 illustrates an example method where a server with a send queue transmits information to a client with a transmit queue via a channel where messages contain sequence identifiers for determining missing or out-of-order information and information is re-transmitted as needed.

Figure 10:
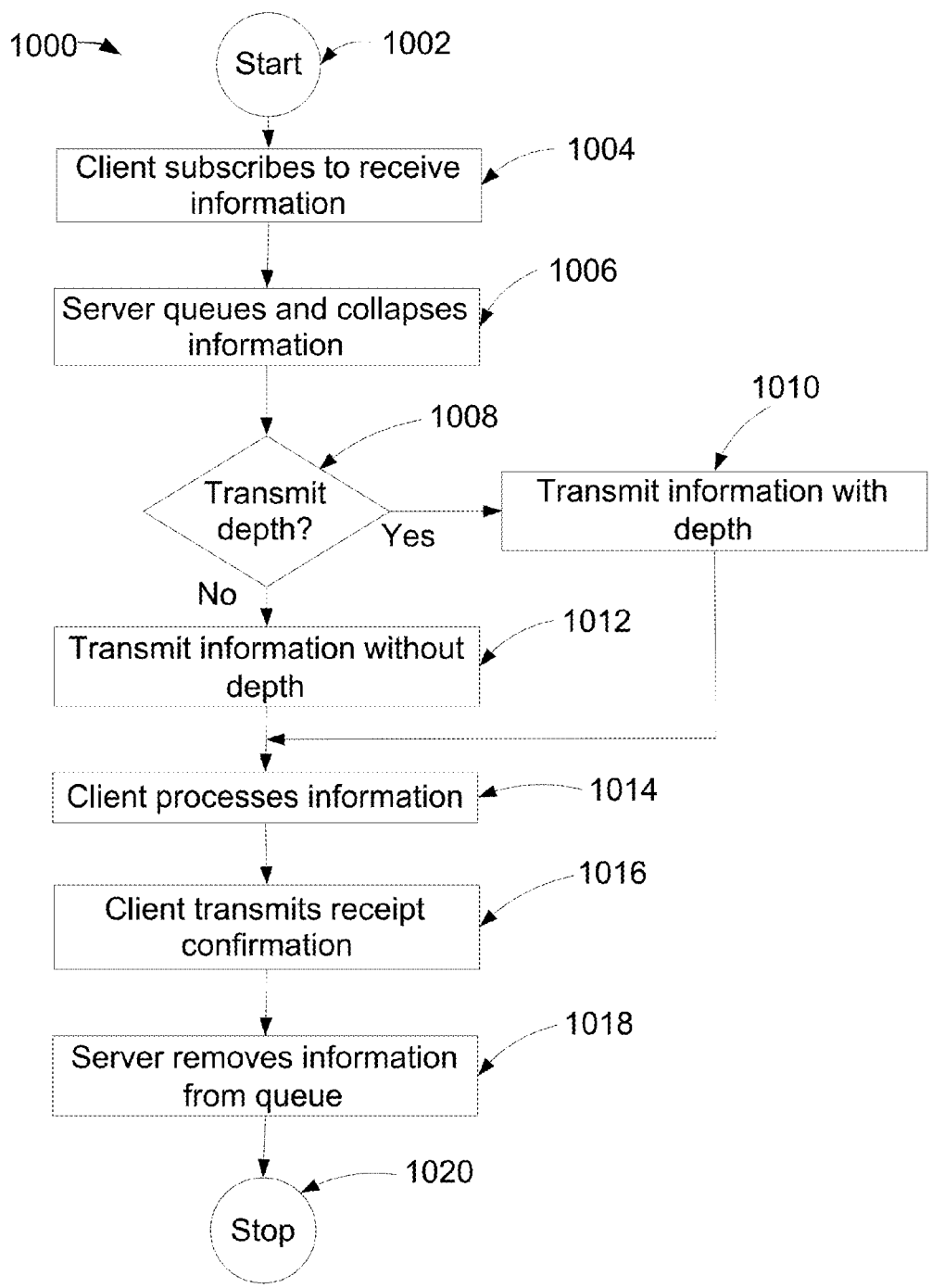
FIG. 10 illustrates an example method for the message protocol described with reference to FIG. 3 and the system as described with reference to FIG. 7D, in accordance with an embodiment of the present invention.

FIG. 10 illustrates an example method for the message protocol described with reference to FIG. 3 and the system as described with reference to FIG. 7D, in accordance with an embodiment of the present invention.

A method 1000 initiates in a step 1002.

Then in a step 1004, client subscribes to receiving information from server.

Client 101 transmits subscribe to quotes 336 to server 102 as described with reference to FIG. 3.

Referring back to FIG. 10, then in a step 1006 server queues and collapses information for transmission.

Server 102 queues and collapses information via queue/collapse quotes 338 as described with reference to FIG. 3.

Referring back to FIG. 10, then in a step 1008, a determination for transmitting information with depth is performed. The transmission of depth is determined by the client 101 depending on what feature is being accessed by the user. Certain features like the market depth popup in the client 101 requires depth and will include a flag to indicate that depth is required along with the subscription of quotes 336 to server 102; otherwise, the flag will indicate that depth is not required and only the subscription of quotes 336 is needed.

For a determination of transmitting information with depth in step 1008, in a step 1010, server transmits information with depth.

Server 102 transmits collapsed quotes with depth 342 to client 101 as described with reference to FIG. 3.

Referring back to FIG. 10, for a determination of transmitting information without depth in step 1008, in a step 1012, server transmits information without depth.

Server 102 transmits collapsed quotes 340 to client 101 as described with reference to FIG. 3.

Referring back to FIG. 10, in a step 1014 client processes information.

Client 101 processes received information via process quotes 344 as described with reference to FIG. 3.

Referring back to FIG. 10, in a step 1016 client transmits receipt of information confirmations to server.

Client 101 transmits quotes receipt confirmation 346 to server 102 as described with reference to FIG. 3.

Referring back to FIG. 10, in a step 1018 server removes information from queue.

Server 102 removes information from queue via remove quotes 348 as described with reference to FIG. 3.

Referring back to FIG. 10, in a step 1020 execution of method 1000 terminates.

FIG. 10 illustrates an example method where a server with a transmit queue and a waiting queue transmits information to a client via a channel where messages are confirmed to have been received by the client and processed by client to ensure that the client always receives the most current information from the server for subscribed information.

Figure 11:
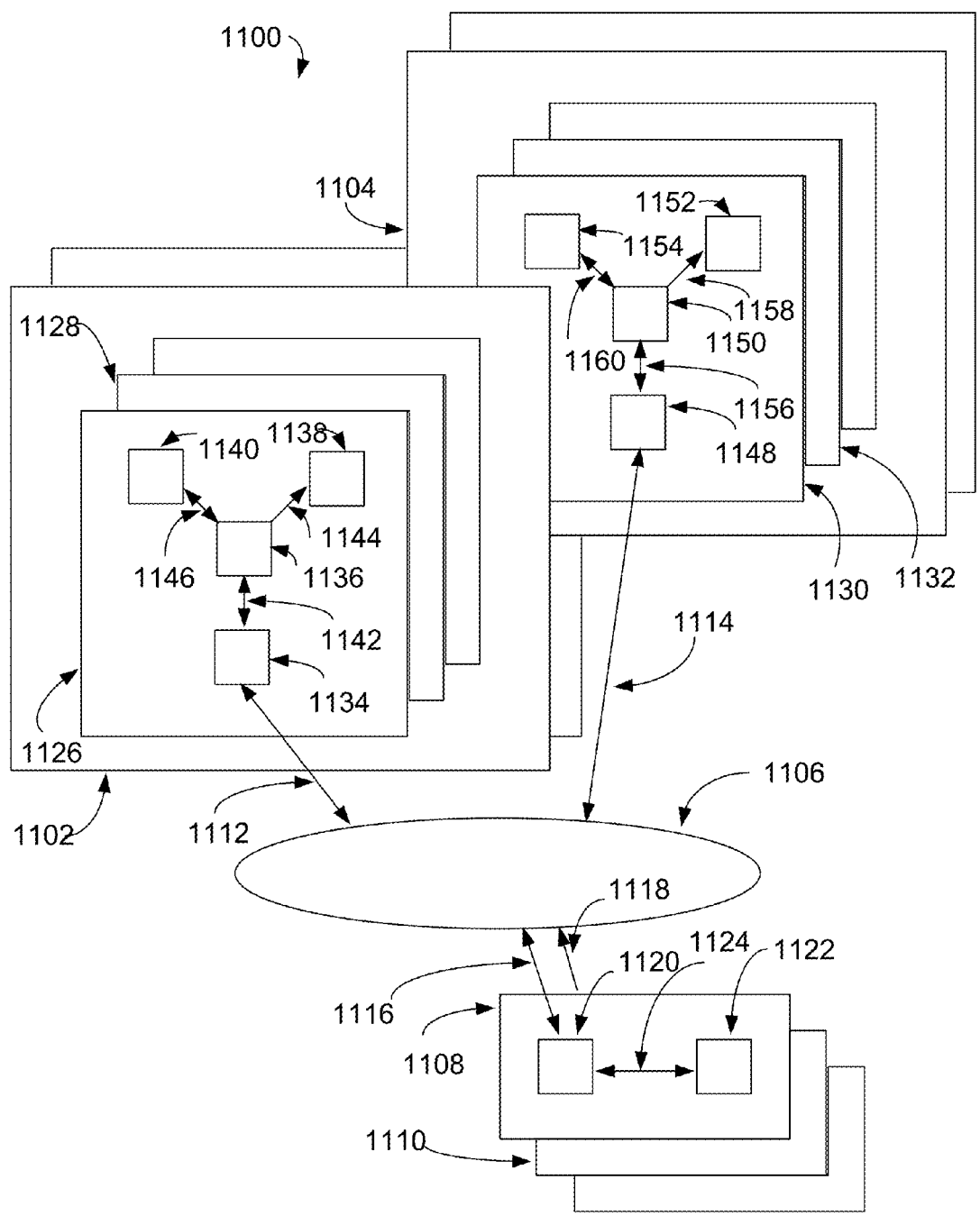
FIG. 11 illustrates a block diagram depicting a conventional client/server communication system.

FIG. 11 illustrates a block diagram depicting a conventional client/server communication system.

A communication system 1100 includes a multiplicity of networked regions with a sampling of regions denoted as a network region 1102 and a network region 1104, a global network 1106 and a multiplicity of servers with a sampling of servers denoted as a server device 1108 and a server device 1110.

Network region 1102 and network region 1104 may operate to represent a network contained within a geographical area or region. Non-limiting examples of representations for the geographical areas for the networked regions may include postal zip codes, telephone area codes, states, counties, cities and countries. Elements within network region 1102 and 1104 may operate to communicate with external elements within other networked regions or within elements contained within the same network region.

In some implementations, global network 1106 may operate as the Internet. It will be understood by those skilled in the art that communication system 1100 may take many different forms. Non-limiting examples of forms for communication system 1100 include local area networks (LANs), wide area networks (WANs), wired telephone networks, cellular telephone networks or any other network supporting data communication between respective entities via hardwired or wireless communication networks. Global network 1106 may operate to transfer information between the various networked elements.

Server device 1108 and server device 1110 may operate to execute software instructions, store information, support database operations and communicate with other networked elements. Non-limiting examples of software and scripting languages which may be executed on server device 1108 and server device 1110 include C, C++, C# and Java.

Network region 1102 may operate to communicate bi-directionally with global network 1106 via a communication channel 1112. Network region 1104 may operate to communicate bi-directionally with global network 1106 via a communication channel 1114. Server device 1108 may operate to communicate bi-directionally with global network 1106 via a communication channel 1116. Server device 1110 may operate to communicate bi-directionally with global network 1106 via a communication channel 1118. Network region 1102 and 1104, global network 1106 and server devices 1108 and 1110 may operate to communicate bi-directionally and also communicate bi-directionally with other networked device located within communication system 1100.

Server device 1108 includes a networking device 1120 and a server 1122. Networking device 1120 may operate to communicate bi-directionally with global network 1106 via communication channel 1116 and with server 1122 via a communication channel 1124. Server 1122 may operate to execute software instructions and store information.

Network region 1102 includes a multiplicity of clients with a sampling denoted as a client 1126 and a client 1128. Client 1126 includes a networking device 1134, a processor 1136, a GUI 1138 and an interface device 1140. Non-limiting examples of devices for GUI 1138 include monitors, televisions, cellular telephones, smartphones and PDAs (Personal Digital Assistants). Non-limiting examples of interface device 1140 include pointing device, mouse, trackball, scanner and printer. Networking device 1134 may communicate bi-directionally with global network 1106 via communication channel 1112 and with processor 1136 via a communication channel 1142. GUI 1138 may receive information from processor 1136 via a communication channel 1144 for presentation to a user for viewing. Interface device 1140 may operate to send control information to processor 1136 and to receive information from processor 1136 via a communication channel 1146. Network region 1104 includes a multiplicity of clients with a sampling denoted as a client 1130 and a client 1132. Client 1130 includes a networking device 1148, a processor 1150, a GUI 1152 and an interface device 1154. Non-limiting examples of devices for GUI 1138 include monitors, televisions, cellular telephones, smartphones and PDAs (Personal Digital Assistants). Non-limiting examples of interface device 1140 include pointing devices, mousse, trackballs, scanners and printers. Networking device 1148 may communicate bi-directionally with global network 1106 via communication channel 1114 and with processor 1150 via a communication channel 1156. GUI 1152 may receive information from processor 1150 via a communication channel 1158 for presentation to a user for viewing. Interface device 1154 may operate to send control information to processor 1150 and to receive information from processor 1150 via a communication channel 1160.

For example, consider the case where a user interfacing with client 1126 may want to execute a networked application. A user may enter the IP (Internet Protocol) address for the networked application using interface device 1140. The IP address information may be communicated to processor 1136 via communication channel 1146. Processor 1136 may then communicate the IP address information to networking device 1134 via communication channel 1142. Networking device 1134 may then communicate the IP address information to global network 1106 via communication channel 1112. Global network 1106 may then communicate the IP address information to networking device 1120 of server device 1108 via communication channel 1116. Networking device 1120 may then communicate the IP address information to server 1122 via communication channel 1124. Server 1122 may receive the IP address information and after processing the IP address information may communicate return information to networking device 1120 via communication channel 1124. Networking device 1120 may communicate the return information to global network 1106 via communication channel 1116. Global network 1106 may communicate the return information to networking device 1134 via communication channel 1112. Networking device 1134 may communicate the return information to processor 1136 via communication channel 1142. Processor 1136 may communicate the return information to GUI 1138 via communication channel 1144. User may then view the return information on GUI 1138.

Figure 12:
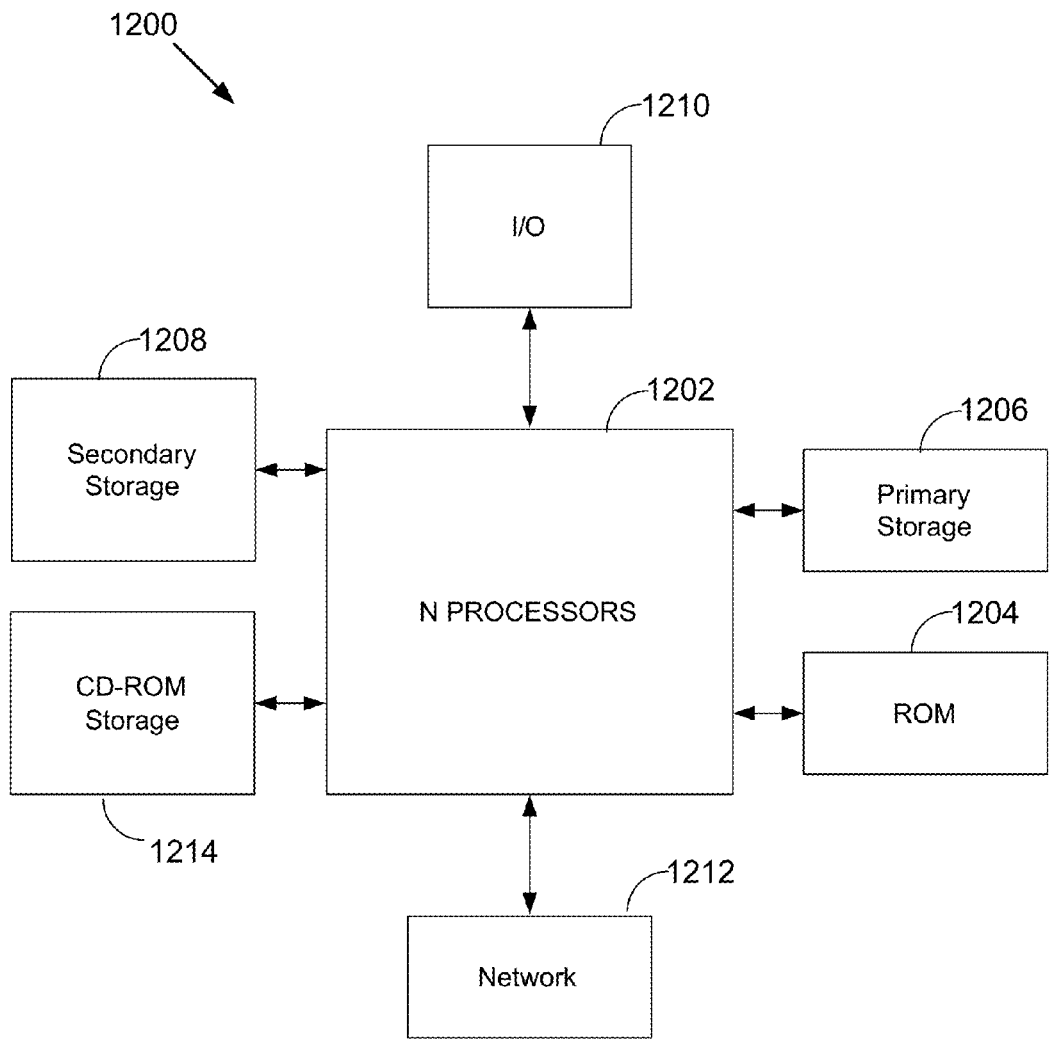
FIG. 12 illustrates a typical computer system that, when appropriately configured or designed, may serve as a computer system for which the present invention may be embodied.

FIG. 12 illustrates a typical computer system that, when appropriately configured or designed, may serve as a computer system 1200 for which the present invention may be embodied.

Computer system 1200 includes a quantity of processors 1202 (also referred to as central processing units, or CPUs) that may be coupled to storage devices including a primary storage 1206 (typically a random access memory, or RAM), a primary storage 1204 (typically a read-only memory, or ROM). CPU 1202 may be of various types including microcontrollers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general purpose microprocessors. As is well known in the art, primary storage 1204 acts to transfer data and instructions uni-directionally to the CPU and primary storage 1206 typically may be used to transfer data and instructions in a bi-directional manner. The primary storage devices discussed previously may include any suitable computer-readable media such as those described above. A mass storage device 1208 may also be coupled bi-directionally to CPU 1202 and provides additional data storage capacity and may include any of the computer-readable media described above. Mass storage device 1208 may be used to store programs, data and the like and typically may be used as a secondary storage medium such as a hard disk. It will be appreciated that the information retained within mass storage device 1208, may, in appropriate cases, be incorporated in standard fashion as part of primary storage 1206 as virtual memory. A specific mass storage device such as a CD-ROM 1214 may also pass data uni-directionally to the CPU.

CPU 1202 may also be coupled to an interface 1210 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1202 optionally may be coupled to an external device such as a database or a computer or telecommunications or internet network using an external connection shown generally as a network 1212, which may be implemented as a hardwired or wireless communications link using suitable conventional technologies. With such a connection, the CPU might receive information from the network, or might output information to the network in the course of performing the method steps described in the teachings of the present invention.

Figure 13:
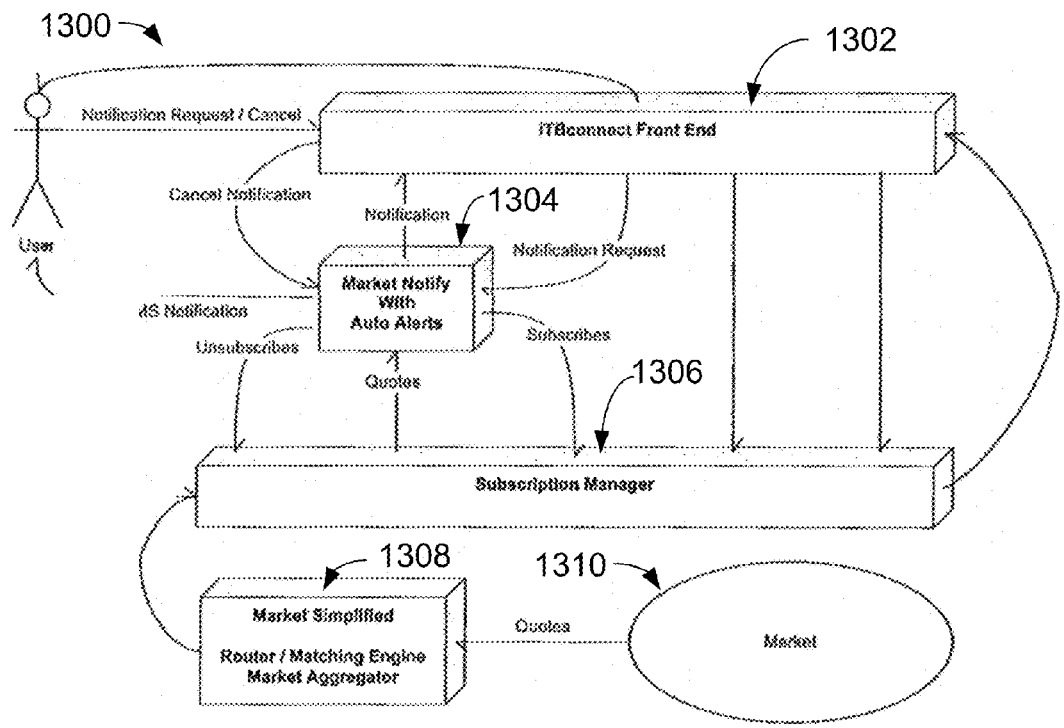
FIG. 13 illustrates an example market notify with auto alerts system, in accordance with an embodiment of the present invention.

FIG. 13 illustrates an example market notify with auto alerts system, in accordance with an embodiment of the present invention.

A system 1300 includes an ITBconnect front end 1302, a market notify/auto alerts 1304, a subscription manager 1306, a router 1308 and a market 1310.

System 1300 helps the user track various bonds by monitoring prices that are provided to system 1300. The prices may be provided from external markets or within system 1300 via Market Simplified. Users can set thresholds based on price and size as well as set the method of auto notification by alerts (e.g. screen popup, email, SMS, etc.) The diagram illustrates an example of the high level flow within system 1300 which may be configured with the Market Notify with Auto Alerts technology.

FIG. 13 illustrates an example market notify with auto alerts system where auto alerts may be configured.

Figure 14:
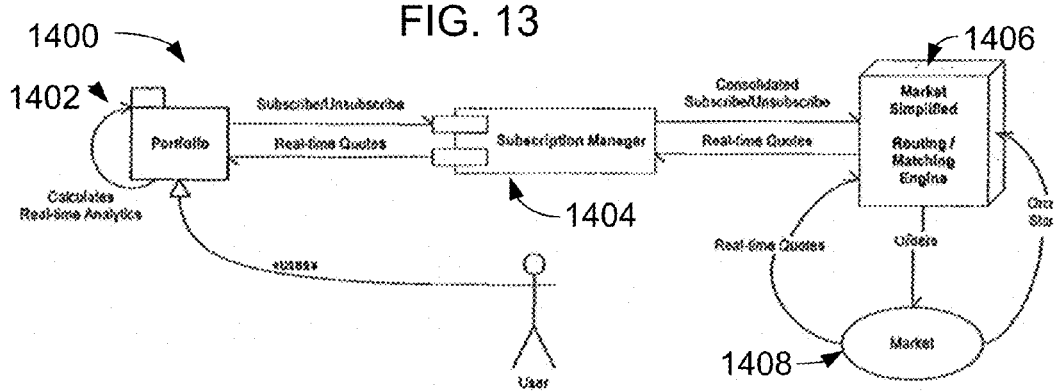
FIG. 14 illustrates an example real-time portfolio analytics system, in accordance with an embodiment of the present invention.

FIG. 14 illustrates an example real-time portfolio analytics system, in accordance with an embodiment of the present invention.

A system 1400 includes a portfolio 1402, a subscription manager 1404, a router 1406 and a market 1408.

System 1400 may utilize real-time bond market information that is accumulated within system 1400. Based on the real-time information, System 1400 can update and calculate analytics (e.g. P&L, Positions, Position Value, etc.) in real-time providing the user with up-to-date metrics.

FIG. 14 illustrates an example real-time portfolio analytics system for updating portfolio associated information.

Figure 15:
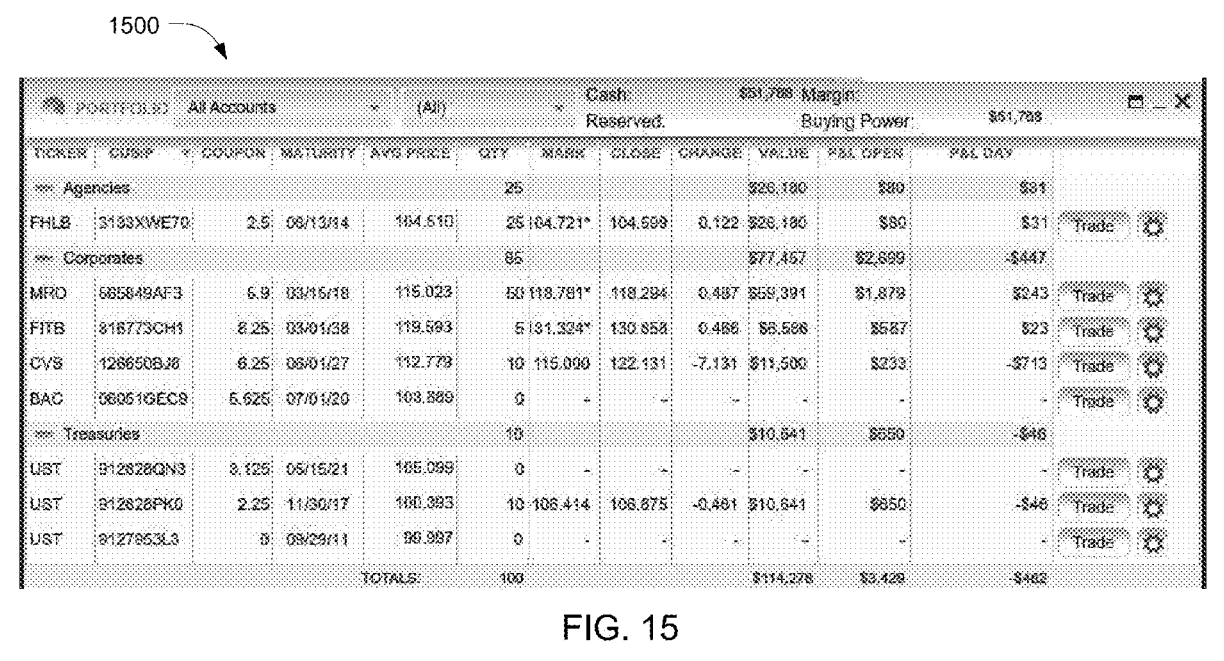

FIG. 15 illustrates an example screen shot associated with real-time portfolio analytics system, in accordance with an embodiment of the present invention.

A presentation information 1500 provides information for viewing by a user.

FIG. 15 illustrates an example screen shot associated with real-time portfolio analytics system where information is presented for viewing by a user.

Figure 16:
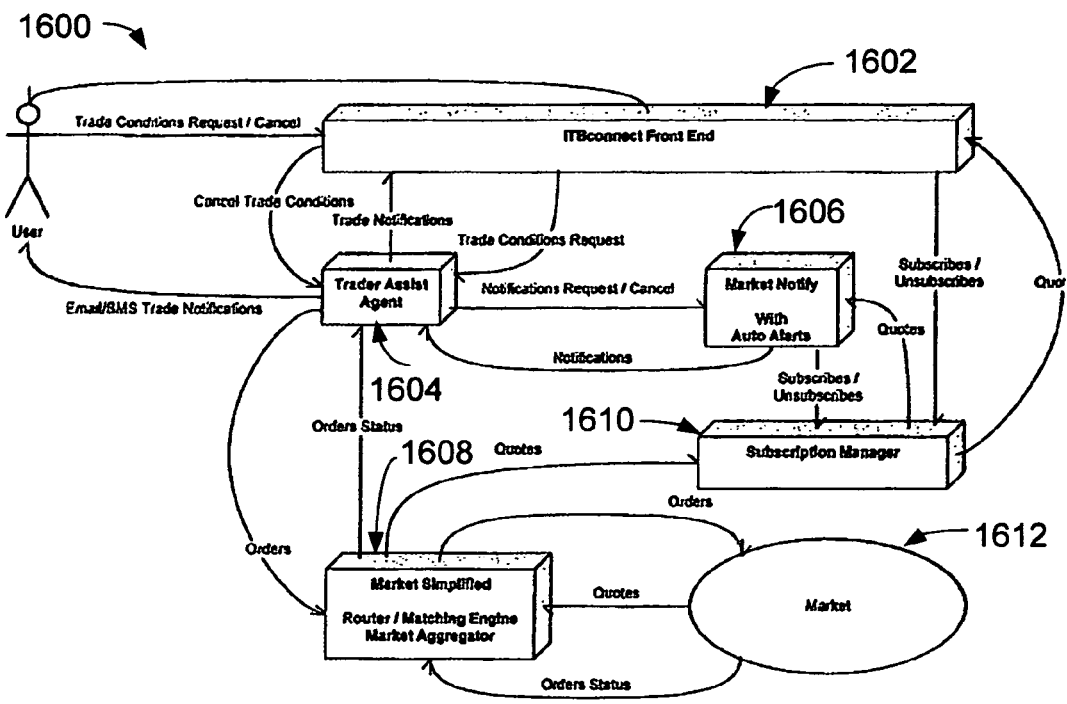
FIG. 16 illustrates an example trader assist system, in accordance with an embodiment of the present invention.

FIG. 16 illustrates an example trader assist system, in accordance with an embodiment of the present invention.

A system 1600 includes an ITBconnect front end 1602, a trader assist agent 1604, a market notify/auto alerts 1606, a subscription manager 1610, a router 1608 and a market 1612.

System 1600 aids the user with automatically entering and executing bond trades based on predefined market thresholds and conditions that the user provides. This can help the user's productivity in managing risk or making use of opportunities in the market without the user's explicit attention. Auto alerts can also be configured similar to the alerts sent by Market Notify.

FIG. 16 illustrates an example trader assist system that notifies and automatically places orders for the user based on user defined parameters.

Figure 17:
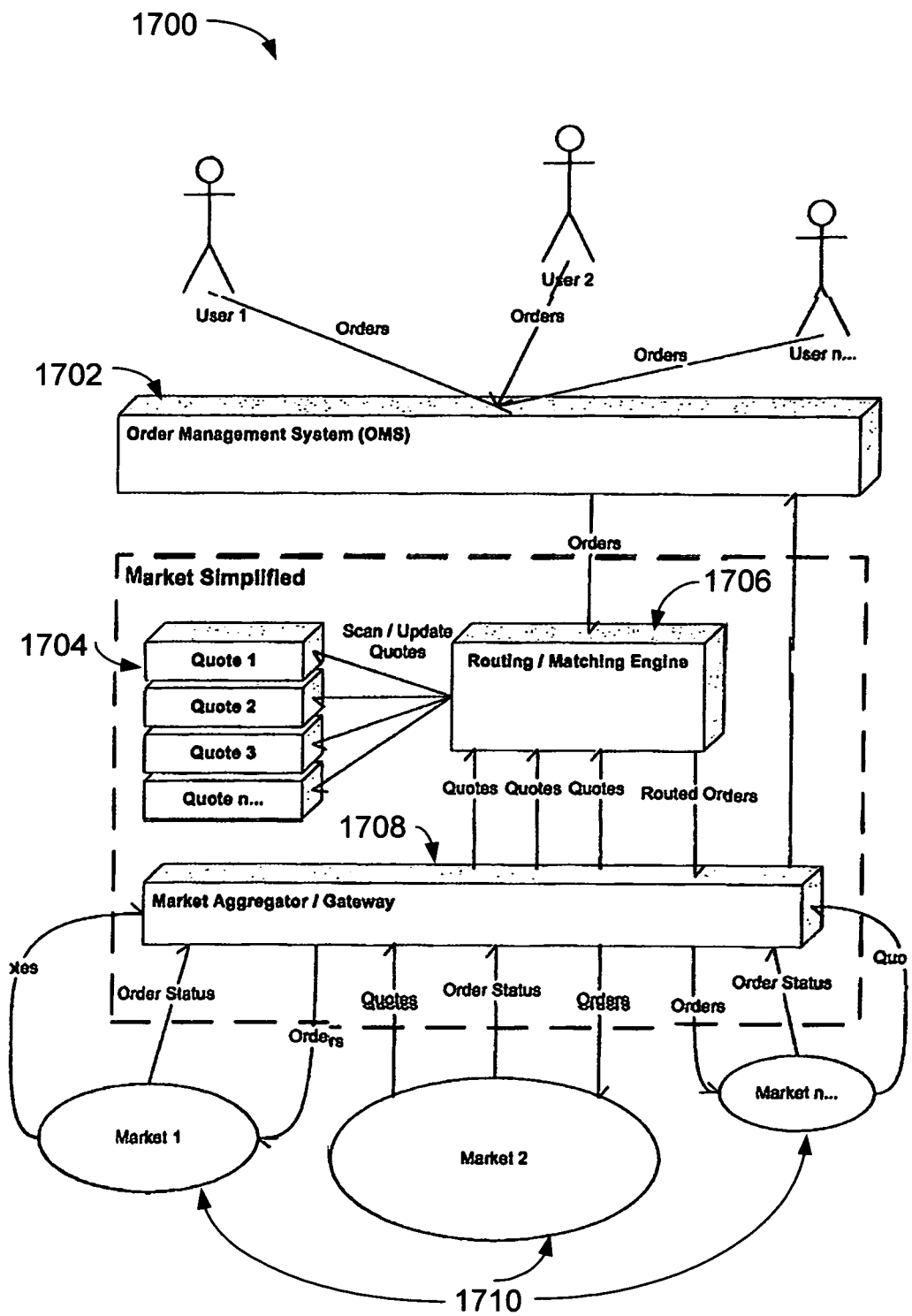
FIG. 17 illustrates an example market simplified system, in accordance with an embodiment of the present invention; and Unless otherwise indicated illustrations in the figures are not necessarily drawn to scale.

FIG. 17 illustrates an example market simplified system, in accordance with an embodiment of the present invention.

A system 1700 includes an order management system 1702, a quotes portion 1704, a routing 1706, gateway 1708 and a markets 1710.

System 1700 serves as a robust routing and matching engine of bond orders and markets as well as an aggregator of bond markets. Two types of executable prices may be tracked by system 1700—they are "orders" and "markets". "Orders" are transaction instructions originated from liquidity takers, and "markets" are transaction instructions generated by liquidity makers. For example, system 1700 may track open "orders" and "markets" for most of the actively traded US Government, Agency, Corporate, and Municipal bonds by the CUSIP numbers assigned to such instruments. When a new "order" or "market" is received by system 1700, the corresponding CUSIP number may be cross checked against other known orders for that CUSIP number within the system and if a match is found, the offsetting orders may be automatically executed and proper notifications may be provided to users. If no matching executions exist for any given CUSIP number, the order persists in system 1700 database and remains in the database until an order or market with a matching CUSIP number is found, or if the user cancels the order. Orders executed on system 1700 represent the best prices at the moment of execution. An inferior price is not executed against any user of system 1700.

FIG. 17 illustrates an example market simplified system.

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied.

It will be further apparent to those skilled in the art that at least a portion of the novel method steps and/or system components of the present invention may be practiced and/or located in location(s) possibly outside the jurisdiction of the United States of America (USA), whereby it will be accordingly readily recognized that at least a subset of the novel method steps and/or system components in the foregoing embodiments must be practiced within the jurisdiction of the USA for the benefit of an entity therein or to achieve an object of the present invention. Thus, some alternate embodiments of the present invention may be configured to comprise a smaller subset of the foregoing means for and/or steps described that the applications designer will selectively decide, depending upon the practical considerations of the particular implementation, to carry out and/or locate within the jurisdiction of the USA. For example, any of the foregoing described method steps and/or system components which may be performed remotely over a network (e.g., without limitation, a remotely located server) may be performed and/or located outside of the jurisdiction of the USA while the remaining method steps and/or system components (e.g., without limitation, a locally located client) of the forgoing embodiments are typically required to be located/performed in the USA for practical considerations. In client-server architectures, a remotely located server typically generates and transmits required information to a US based client, for use according to the teachings of the present invention. Depending upon the needs of the particular application, it will be readily apparent to those skilled in the art, in light of the teachings of the present invention, which aspects of the present invention can or should be located locally and which can or should be located remotely. Thus, for any claims construction of the following claim limitations that are construed under 35 USC §112 (6) it is intended that the corresponding means for and/or steps for carrying out the claimed function are the ones that are locally implemented within the jurisdiction of the USA, while the remaining aspect(s) performed or located remotely outside the USA are not intended to be construed under 35 USC §112 (6). In some embodiments, the methods and/or system components which may be located and/or performed remotely include, without limitation: servers and global networks.

It is noted that according to USA law, all claims must be set forth as a coherent, cooperating set of limitations that work in functional combination to achieve a useful result as a whole. Accordingly, for any claim having functional limitations interpreted under 35 USC §112 (6) where the embodiment in question is implemented as a client-server system with a remote server located outside of the USA, each such recited function is intended to mean the function of combining, in a logical manner, the information of that claim limitation with at least one other limitation of the claim. For example, in client-server systems where certain information claimed under 35 USC §112 (6) is/(are) dependent on one or more remote servers located outside the USA, it is intended that each such recited function under 35 USC §112 (6) is to be interpreted as the function of the local system receiving the remotely generated information required by a locally implemented claim limitation, wherein the structures and or steps which enable, and breath life into the expression of such functions claimed under 35 USC §112 (6) are the corresponding steps and/or means located within the jurisdiction of the USA that receive and deliver that information to the client (e.g., without limitation, client-side processing and transmission networks in the USA). When this application is prosecuted or patented under a jurisdiction other than the USA, then "USA" in the foregoing should be replaced with the pertinent country or countries or legal organization(s) having enforceable patent infringement jurisdiction over the present application, and "35 USC §112 (6)" should be replaced with the closest corresponding statute in the patent laws of such pertinent country or countries or legal organization(s).

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Having fully described at least one embodiment of the present invention, other equivalent or alternative methods of financial security communication systems according to the present invention will be apparent to those skilled in the art. The invention has been described above by way of illustration, and the specific embodiments disclosed are not intended to limit the invention to the particular forms disclosed. For example, the particular implementation of the GUI may vary depending upon the particular type computing device used. The computing devices described in the foregoing were directed to notebook computing implementations; however, similar techniques using mobile computing device implementations of the present invention are contemplated as within the scope of the present invention. The invention is thus to cover all modifications, equivalents, and alternatives falling within the spirit and scope of the following claims.

Claim elements and steps herein may have been numbered and/or lettered solely as an aid in readability and understanding. Any such numbering and lettering in itself is not intended to and should not be taken to indicate the ordering of elements and/or steps in the claims.

What is claimed is:

1. A non-transitory computer-readable storage medium with an executable program stored thereon, wherein the program instructs a processor to perform the following steps:
   queuing a request to be sent to a server over a network;
   transmitting the request to the server in which the server determines if a previous executed response to the request was transmitted, if a previous response was transmitted, the server retransmits a corresponding acknowledgement and the previous response, if the request is new, the server queues a response and determines if the request is out of sequence, if the request is out of sequence the server transmits an acknowledgment and an out of order response, if the request is in sequence the server the server determines if a timeout has occurred, if the timeout has occurred the server transmits an acknowledgment and asynchronously transmits an executed response, in absence of the timeout the server transmits the executed response;
   receiving the corresponding acknowledgement and previous response;
   removing the request from said queuing in response to said receiving the corresponding acknowledgement and previous response;
   transmitting a response receipt confirmation to the server in response to removing the request from said queuing in which the server removes a queued response for the request;
   determining if the server did not respond previously, if the server did not respond previously the server receiving the out of order response;
   retransmitting missing requests to the server, in response to the out of order response, in which the server asynchronously transmits executed responses;
   receiving executed responses;
   removing the missing requests from said queuing in response to said receiving executed responses;
   transmitting a response receipt confirmation to the server in response to removing the missing requests from said queuing in which the server removes queued responses;
   receiving the executed response;
   removing the request from said queuing in response to said receiving the executed response; and
   transmitting a response receipt confirmation to the server in response to removing the request from said queuing in which the server removes the queued response and processing of requests in order of transmission and detection/retransmission of missing requests is enabled.

2. The program instructing the processor as recited in claim 1, further comprising the steps of:
   receiving a message from the server in which the server has queued the message;
   transmitting to the server a message receipt confirmation in which the server removes the queued message;
   determining if the message is out of sequence, if the message is out of sequence transmitting a resend missing message in which the server transmits missing messages; and
   receiving missing messages and in response to said receiving missing messages transmitting to the server receipt confirmations in which the server removes the queued messages.

3. The program instructing the processor as recited in claim 2, further comprising the steps of:
- transmitting to the server a subscription to receive one or more quotes in which the server queues the quotes, collapses the quotes and transmits the collapsed quotes;
- receiving the collapsed quotes; and
- transmitting to the server a quotes received confirmation in which the server removes the queued quotes.

4. The program instructing the processor as recited in claim 3, in which same subscription for quotes are consolidated into a single subscription for a quote.

5. The program instructing the processor as recited in claim 2, in which multiple messages are consolidated into one message for transmission.

6. The program instructing the processor as recited in claim 1, in which queue portions are established for retaining information transmitted and received.

7. The program instructing the processor as recited in claim 1, in which the steps are comprised in a bond trading system.

8. A system comprising:
- a client being configured for: queuing a request to be sent over a network; transmitting the request; receiving an out of order response; retransmitting missing requests, in response to the out of order response; receiving executed responses in response to the missing requests; removing the missing requests from said queuing in response to said receiving executed responses; transmitting a response receipt confirmation to the server in response to removing the missing requests from said queuing; receiving an executed response; removing the request from said queuing in response to said receiving the executed response; and transmitting a response receipt confirmation in response to removing the request from said queuing; and
- a server being configured for: receiving the request; queuing a response; determining if the request is out of sequence, if the request is out of sequence transmitting an acknowledgment and an out of order response, if the request is in sequence determining if a timeout has occurred, if the timeout has occurred transmitting an acknowledgment and asynchronously transmitting an executed response, in absence of the timeout transmitting the executed response; receiving missing requests, in response to the out of order response; asynchronously transmitting executed responses; receiving the response receipt confirmation; removing queued responses to the missing requests; receiving the response receipt confirmation for the executed response; and removing the request from said queuing in which processing of requests in order of transmission and detection/retransmission of missing requests is enabled.

9. The system as recited in claim 8, in which said client is further configured for:
- receiving a message from the server; transmitting to the server a message receipt confirmation in; determining if the message is out of sequence, if the message is out of sequence transmitting a resend missing message; receiving missing messages; and in response to said receiving missing messages transmitting receipt confirmations; and
- said server is further configured for queuing the message; transmitting the message; receiving the message receipt confirmation; removing the queued message in response to said receiving the message receipt confirmation; receiving the resend missing message; transmitting the missing messages in response to said receiving the resend missing message; receiving the receipt confirmations; and removing the queued messages in response to said receiving the receipt confirmations.

10. The system as recited in claim 9, in which said client is further configured for:
- transmitting to the server a subscription to receive one or more quotes; receiving collapsed quotes; and
- transmitting to the server a quotes received confirmation; and
- said server is further configured for receiving the subscription; queuing the quotes; collapsing the quotes; transmitting the collapsed quotes; receiving the quotes received confirmation; and removing the queued quotes in response to said receiving the quotes received confirmation.

11. The system as recited in claim 10, in which said client is further configured for consolidating same subscription for quotes into a single subscription for a quote.

12. The system as recited in claim 9, in which said server is further configured for consolidating multiple messages into one message for transmission.

13. The system as recited in claim 8, in which said client and said server are further configured with queue portions for retaining information transmitted and received.

14. The system as recited in claim 8, in which client and said server are comprised in a bond trading system.

15. A non-transitory program storage device readable by a machine tangibly embodying a program of instructions executable by the machine to perform a method for processing requests, comprising:
- computer code for queuing a request to be sent to a server over a network;
- computer code for transmitting the request to the server in which the server determines if a previous executed response to the request was transmitted, if a previous response was transmitted, the server retransmits a corresponding acknowledgement and the previous response, if the request is new, the server queues a response and determines if the request is out of sequence, if the request is out of sequence the server transmits an acknowledgment and an out of order response, if the request is in sequence the server the server determines if a timeout has occurred, if the timeout has occurred the server transmits an acknowledgment and asynchronously transmits an executed response, in absence of the timeout the server transmits the executed response;
- computer code for receiving the corresponding acknowledgement and previous response;
- computer code for removing the request from said queuing in response to said receiving the corresponding acknowledgement and previous response;
- computer code for transmitting a response receipt confirmation to the server in response to removing the request from said queuing in which the server removes a queued response for the request;
- computer code for determining if the server did not respond previously, if the server did not respond previously the server receiving the out of order response;
- computer code for retransmitting missing requests to the server, in response to the out of order response, in which the server asynchronously transmits executed responses;
- computer code for receiving executed responses;
- computer code for removing the missing requests from said queuing in response to said receiving executed responses;

computer code for transmitting a response receipt confirmation to the server in response to removing the missing requests from said queuing in which the server removes queued responses;

computer code for receiving the executed response;

computer code for removing the request from said queuing in response to said receiving the executed response; and computer code for transmitting a response receipt confirmation to the server in response to removing the request from said queuing in which the server removes the queued response and processing of requests in order of transmission and detection/retransmission of missing requests is enabled.

16. The program storage device as recited in claim 15, further comprising:

computer code for receiving a message from the server in which the server has queued the message;

computer code for transmitting to the server a message receipt confirmation in which the server removes the queued message;

computer code for determining if the message is out of sequence, if the message is out of sequence transmitting a resend missing message in which the server transmits missing messages; and computer code for receiving missing messages and in response to said receiving missing messages transmitting to the server receipt confirmations in which the server removes the queued messages.

17. The program storage device as recited in claim 16, further comprising:

computer code for transmitting to the server a subscription to receive one or more quotes in which the server queues the quotes, collapses the quotes and transmits the collapsed quotes;

computer code for receiving the collapsed quotes; and computer code for transmitting to the server a quotes received confirmation in which the server removes the queued quotes.

18. The program storage device as recited in claim 17, in which same subscription for quotes are consolidated into a single subscription for a quote.

19. The program storage device as recited in claim 16, in which multiple messages are consolidated into one message for transmission.

20. The program storage device as recited in claim 15, in which queue portions are established for retaining information transmitted and received.

* * * * *